(12) United States Patent
Jeon et al.

(10) Patent No.: US 11,996,240 B2
(45) Date of Patent: May 28, 2024

(54) ELECTRONIC COMPONENT HAVING A BODY AND SEALING THIN FILM DISPOSED IN A MICROHOLE OF THE BODY

(71) Applicant: SAMSUNG ELECTRO-MECHANICS CO., LTD., Suwon-si (KR)

(72) Inventors: Kong Joo Jeon, Suwon-si (KR); So Jung An, Suwon-si (KR); Kwang Yeun Won, Suwon-si (KR); Woo Kyung Sung, Suwon-si (KR); Kyu Sik Park, Suwon-si (KR); Myung Jun Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 82 days.

(21) Appl. No.: 17/496,659

(22) Filed: Oct. 7, 2021

(65) Prior Publication Data

US 2022/0199331 A1  Jun. 23, 2022

(30) Foreign Application Priority Data

Dec. 18, 2020 (KR) .......................... 10-2020-0178556

(51) Int. Cl.
*H01G 4/30* (2006.01)
*H01G 2/10* (2006.01)
(Continued)

(52) U.S. Cl.
CPC ............... *H01G 4/30* (2013.01); *H01G 2/103* (2013.01); *H01G 4/008* (2013.01); *H01G 4/012* (2013.01); *H01G 4/12* (2013.01); *H01G 13/00* (2013.01)

(58) Field of Classification Search
CPC .......... H01G 4/30; H01G 2/103; H01G 4/008; H01G 4/012; H01G 4/12; H01G 4/1227;
(Continued)

(56) References Cited

U.S. PATENT DOCUMENTS 10,395,840 B1 * 8/2019 Park ....................... H01G 2/065
10,535,469 B1   1/2020 Jo et al.
(Continued)

FOREIGN PATENT DOCUMENTS

JP          4167360 B2    10/2008
JP       2016-066783 A     4/2016
(Continued)

*Primary Examiner* — David M Sinclair
*Assistant Examiner* — Daniel M Dubuisson
(74) *Attorney, Agent, or Firm* — Morgan, Lewis & Bockius LLP

(57) ABSTRACT

An electronic component includes a microbody including a body including a plurality of dielectric layers and a plurality of internal electrodes disposed with a corresponding dielectric layer interposed therebetween, and an electrode layer disposed on an external side surface of the body and connected to a portion of the plurality of internal electrodes; and a sealing thin film. The microbody includes a microhole extending in at least a portion of the dielectric layer, the internal electrode, and the electrode layer through a surface of the microbody. The sealing thin film includes an internal sealing thin film disposed in at least a portion of an internal space of the open microhole to seal the microhole.

17 Claims, 19 Drawing Sheets

(51) Int. Cl.
  *H01G 4/008* (2006.01)
  *H01G 4/012* (2006.01)
  *H01G 4/12* (2006.01)
  *H01G 13/00* (2013.01)

(58) Field of Classification Search
  CPC ...... H01G 4/224; H01G 4/232; H01G 4/2325;
    H01G 4/005; H01G 4/085; H01G 4/1218;
    H01G 4/1209
  See application file for complete search history.

(56) References Cited

U.S. PATENT DOCUMENTS

| | | | | |
|---|---|---|---|---|
| 2006/0234022 | A1* | 10/2006 | Liu | H01G 4/2325 361/306.3 |
| 2011/0193448 | A1* | 8/2011 | Saruban | H01G 4/005 336/200 |
| 2011/0287176 | A1 | 11/2011 | Saito et al. | |
| 2012/0154977 | A1* | 6/2012 | Hur | H01G 4/2325 156/89.18 |
| 2012/0295122 | A1* | 11/2012 | Park | C03C 3/089 428/471 |
| 2013/0250480 | A1* | 9/2013 | Ahn | H01G 4/129 156/89.12 |
| 2015/0287532 | A1* | 10/2015 | Abe | H05K 3/3436 427/79 |
| 2016/0024346 | A1* | 1/2016 | Inoue | H01G 4/224 336/200 |
| 2016/0027585 | A1* | 1/2016 | Inoue | H01G 4/1209 29/25.42 |
| 2016/0071648 | A1* | 3/2016 | Dernovsek | C25D 3/56 338/222 |
| 2016/0086733 | A1 | 3/2016 | Saito et al. | |
| 2016/0172110 | A1 | 6/2016 | Otani | |
| 2019/0103225 | A1* | 4/2019 | Han | H01G 4/2325 |
| 2019/0115148 | A1* | 4/2019 | Nomura | H01F 27/292 |
| 2020/0312571 | A1* | 10/2020 | Yatagawa | H01G 4/012 |
| 2020/0362127 | A1* | 11/2020 | Tatemichi | H01G 4/18 |
| 2020/0411247 | A1* | 12/2020 | Saruban | H01G 4/12 |

FOREIGN PATENT DOCUMENTS

| | | |
|---|---|---|
| JP | 6610086 B2 | 11/2019 |
| KR | 10-1200686 B1 | 11/2012 |
| KR | 10-2029598 B1 | 10/2019 |

* cited by examiner

ELECTRONIC COMPONENT HAVING A BODY AND SEALING THIN FILM DISPOSED IN A MICROHOLE OF THE BODY

CROSS-REFERENCE TO RELATED APPLICATION(S)

This application claims benefit of priority to Korean Patent Application No. 10-2020-0178556 filed on Dec. 18, 2020 in the Korean Intellectual Property Office, the disclosure of which is incorporated herein by reference in its entirety.

TECHNICAL FIELD

The present disclosure relates to an electronic component and a method of manufacturing the same.

BACKGROUND

Among electronic components, a multilayer ceramic capacitor (MLCC) may be a chip-type condenser mounted the printed circuit boards of various electronic products such as imaging devices including a liquid crystal display (LCD), computers, smartphones, and mobile phones, and charging or discharging electricity.

A multilayer capacitor may be used as a component of various electronic devices as a multilayer capacitor may have a small size and high capacitance, and may be easily mounted. Recently, as components of electronic devices have been miniaturized, demand for miniaturization and high capacitance of multilayer capacitors has increased.

A multilayer capacitor may include a plurality of dielectric layers, a plurality of internal electrodes alternately disposed with the dielectric layer interposed therebetween, and an external electrode connected to the internal electrode. The dielectric layer, the internal electrode, and the external electrode may preferably be closely coupled to each other, but defects may occur in some cases. Such defects may become a path for fluid permeation.

SUMMARY

An aspect of the present disclosure is to provide an electronic component in which a path of fluid penetration into the electronic component is blocked.

An aspect of the present disclosure is to provide a method of manufacturing an electronic component in which a path of fluid penetration into the electronic component is blocked.

According to an aspect of the present disclosure, an electronic component includes a microbody including a body including a plurality of dielectric layers and a plurality of internal electrodes disposed with a corresponding dielectric layer interposed therebetween, and an electrode layer disposed on an external side surface of the body and connected to a portion of the plurality of internal electrodes; and a sealing thin film. The microbody includes a microhole extending in at least a portion of the dielectric layer, the internal electrode, and the electrode layer through a surface of the microbody. The sealing thin film includes an internal sealing thin film disposed in at least a portion of an internal space of the microhole to seal the open microhole.

According to another aspect of the present disclosure, an electronic component includes a body including a plurality of dielectric layers and a plurality of internal electrodes disposed with a corresponding dielectric layer therebetween; an external electrode including an electrode layer disposed on the body and connected to a corresponding internal electrode, and a plating layer disposed on the electrode layer; and an external sealing thin film disposed on an interfacial surface between an end of the electrode layer and the body.

According to another aspect of the present disclosure, a method of manufacturing an electronic component includes providing a microbody including a body including a plurality of dielectric layers and a plurality of internal electrodes disposed with a corresponding dielectric layer interposed therebetween, and an electrode layer disposed on an external side surface of the body and connected to a portion of the plurality of internal electrodes; forming a sealing thin film on a microbody by a vapor deposition process; and removing at least a portion of the sealing thin film.

BRIEF DESCRIPTION OF DRAWINGS

The above and other aspects, features, and advantages of the present disclosure will be more clearly understood from the following detailed description, taken in conjunction with the accompanying lead-outs, in which.

DETAILED DESCRIPTION

Figure 1:
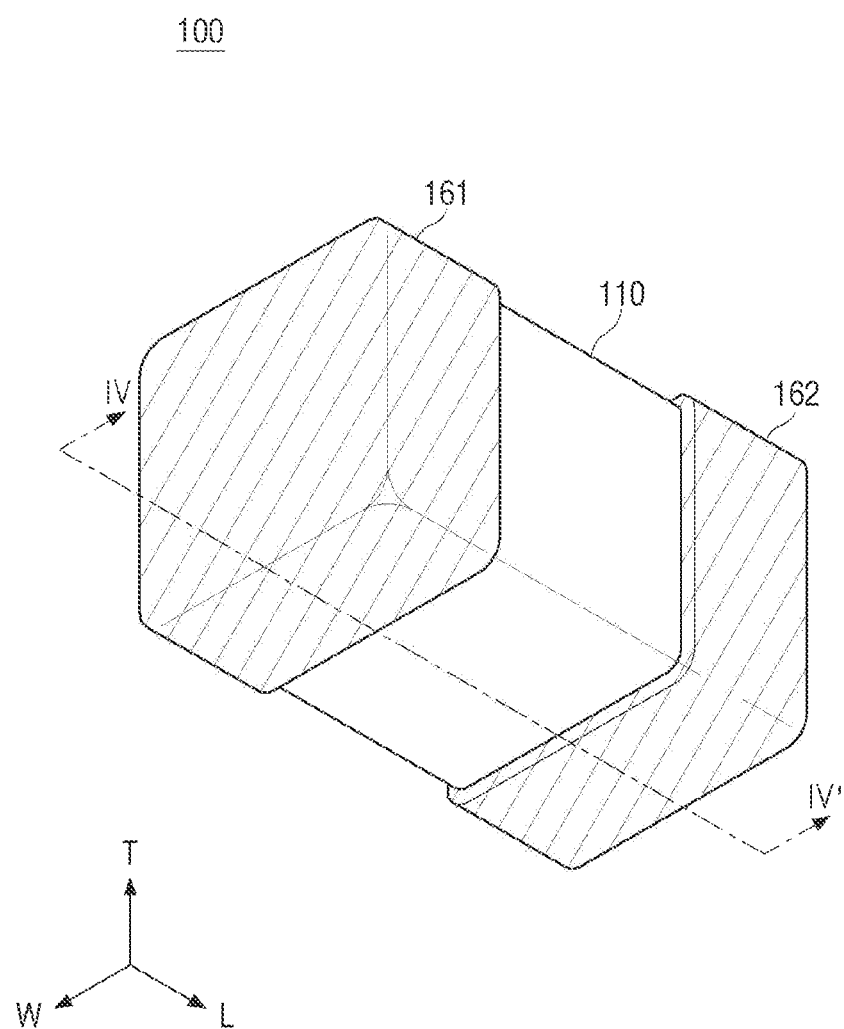
FIG. 1 is a perspective diagram illustrating an electronic component according to an example embodiment.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clarity of description, and elements indicated by the same reference numeral are the same elements in the drawings.

The configuration in which an element or layer is referred to as being disposed "on" another element or layer may include the configuration in which another layer or another element is interposed therebetween, as well as being directly disposed on another element or layer. The configuration in which an element is referred to as being "directly on" indicates that no other element or layer is interposed therebetween.

The spatially relative terms "below," "beneath," "lower," "above," and "upper," spatially relative terms, may be used to easily describe correlation between elements. Spatially relative terms may include different directions of an element while being used or operating in addition to the directions illustrated in the drawings. For example, when an element illustrated in the drawings is upside down, an element described as "below" or "beneath" another element may be placed "above" another element. Accordingly, an example term "below" may include both directions of below and above. An element may be oriented in other directions, and accordingly, spatially relative terms may be interpreted according to the orientation.

The terms "first," "second," and the like may be used to describe various elements, and/or sections, elements, and/or sections are not limited to the terms. These terms are only used to distinguish one element or section from another element or section. Therefore, a first element, a first element, or a first section mentioned below may be a second element, a second element, or a second section in example embodiments.

Figure 3:
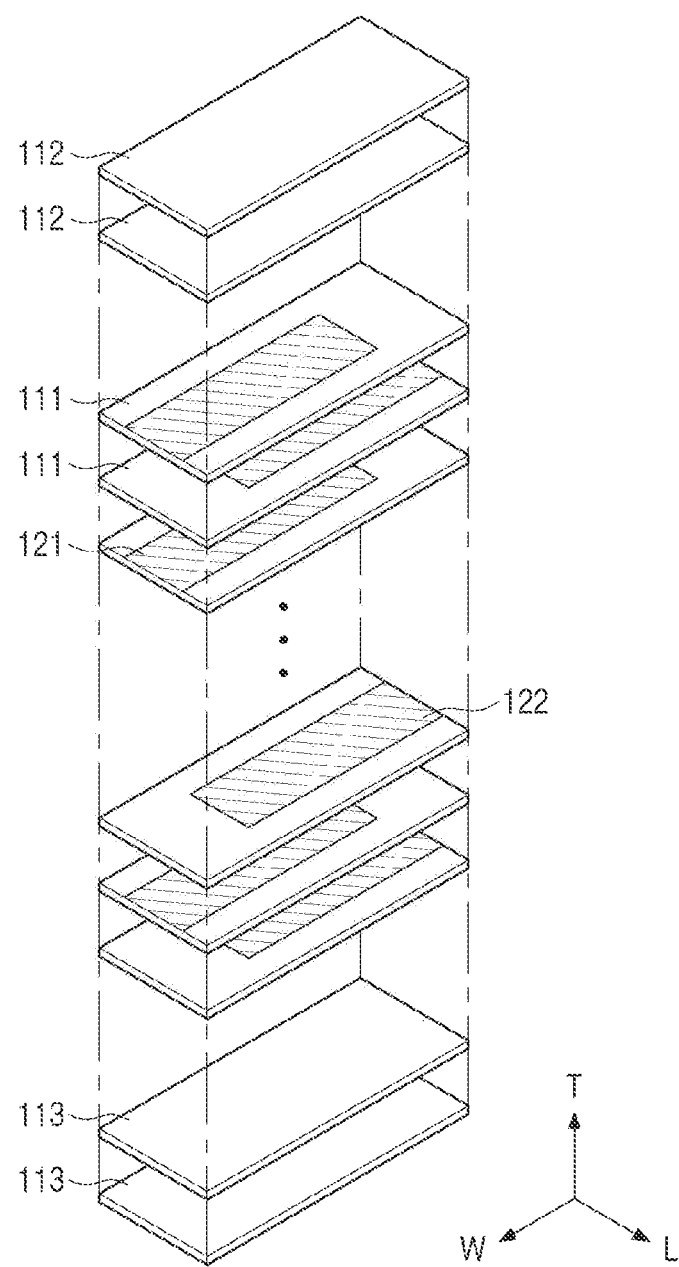
FIG. 3 is an exploded perspective diagram illustrating a body of the electronic component in FIG. 1.
Figure 4:
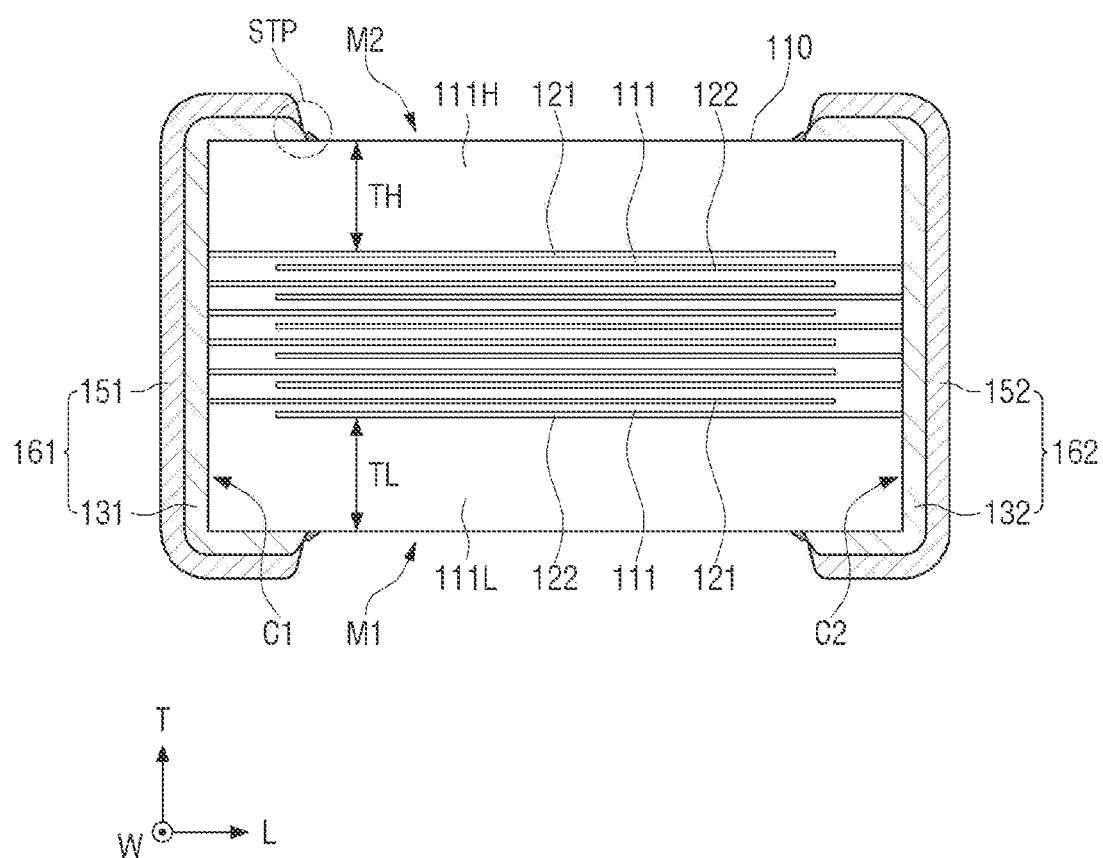
FIG. 4 is a cross-sectional diagram taken along line IV-IV in FIG. 1.

FIG. 1 is a perspective diagram illustrating an electronic component according to an example embodiment. FIG. is an exploded perspective diagram illustrating the electronic component in FIG. 1. FIG. 3 is an exploded perspective diagram illustrating a body of the electronic component in FIG. 1. FIG. 4 is a cross-sectional diagram taken along line IV-IV in FIG. 1.

Referring to FIGS. 1 to 4, an electronic component 100 may include a first internal electrode and a second internal electrode separated from each other, and a dielectric interposed therebetween. A plurality of the first internal electrodes and a plurality of the second internal electrodes may be provided, and may be alternately laminated with each other. A dielectric may be interposed between the internal electrodes. The plurality of first internal electrodes, the plurality of second internal electrodes, and the dielectrics may form a multilayer capacitor. In the description below, the configuration of the electronic component will be described in greater detail.

The electronic component 100 may include a body 110, a first external electrode 161, and a second external electrode 162.

Figure 2:
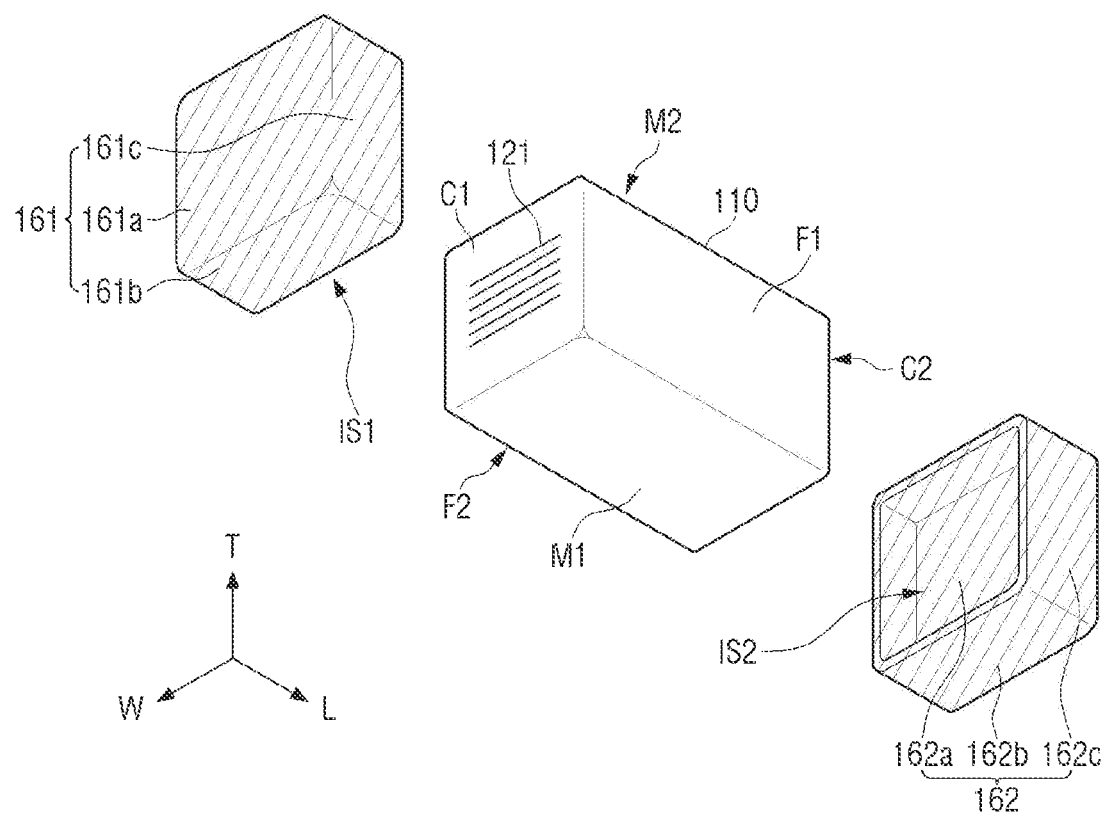
FIG. 2 is an exploded perspective diagram illustrating the electronic component in FIG. 1.

The body 110 may have, for example, a hexahedral shape. For example, the body 110 may include six surfaces M1, M2, F1, F2, C1, and C2, as illustrated in FIG. 2. The first and second surfaces M1 and M2 may oppose each other in a third direction T (or in a thickness direction of the body 110). When the electronic component 100 is mounted on a substrate, the first surface M1 or the second surface M2 may be a surface mounted on the substrate (a mounting surface). The third and fourth surfaces F1 and F2 may oppose each other in a second direction W (or in a width direction of the body 110). The third and fourth surfaces F1 and F2 may be connected to the first and second surfaces M1 and M2. The fifth and sixth surfaces C1 and C2 may oppose each other in a first direction L (or in a length direction of the body 110). The fifth and sixth surfaces C1 and C2 may be connected to the first surface M1, the second surface M2, the third surface F1, and the fourth surface F2.

As illustrated in FIG. 3, the body 110 may include the plurality of dielectric layers 111, the plurality of first internal electrodes 121, and the plurality of second internal electrodes 122. In other words, the plurality of dielectric layers 111 may be laminated, and the plurality of first internal electrodes 121 and the plurality of second internal electrodes 122 may be alternately disposed with the dielectric layer 111 interposed therebetween.

The plurality of dielectric layers 111 may be in a sintered state, and may be integrated such that boundaries between adjacent layers may not be distinct.

The dielectric layer 111 may include a ceramic material having a high dielectric constant, and may include, for example, barium titanate ($BaTiO_3$) powder or strontium titanate ($SrTiO_3$) powder, but an example embodiment thereof is not limited thereto. In other words, any material which may obtain sufficient electrostatic capacitance may be used. Also, a ceramic additive, an organic solvent, an organic binder, a plasticizer, a binder, and a dispersant may be selectively further added to the dielectric layer 111 along with the ceramic powder. Ceramic additives may include transition metal oxides or carbides, rare earth elements, magnesium (Mg) or aluminum (Al), but an example of the ceramic additives are not limited thereto.

The plurality of first internal electrodes 121 may overlap the plurality of second internal electrodes 122 in the third direction T (or in the thickness direction of the body 110), and an area of overlap may be related to the formation of capacitance of the capacitor.

The first internal electrode 121 and the second internal electrode 122 may include nickel (Ni). The first internal electrode 121 and the second internal electrode 122 include nickel as a main component, and may further include an additive. For example, at least one material selected from a group including Li, Na, and K may be used as the additive to increase conductivity of the internal electrodes 121 and 122 by reducing the formation of nickel oxide (NiO). Also, to improve reliability of the internal electrodes 121 and 122, at least one material selected from a group including Sn, Cu, Ag, Pb, Pt, Rh, Ir, Ru, Os, In, Ga, Zn, Bi, and Pb may be used as the additive. Also, to uniformly form a composition of an interfacial surface of the internal electrodes 121 and 122, at least one material selected from a group including Ba, Mg, Dy, and Ti may be used as the additive.

As illustrated in FIG. 4, the plurality of first internal electrodes 121 may be exposed to (or be in contact with or extend from) the fifth surface C1 and may be electrically connected to the first external electrode 161. The plurality of second internal electrodes 122 may be exposed to (or be in contact with or extend from) the sixth surface C2 and may be electrically connected to the second external electrode 162. When a voltage is applied to the first and second external electrodes 161 and 162, electrical charges may be accumulated between the first and second internal electrodes 121 and 122 opposing each other.

The body 110 further may include a lower cover layer 111L disposed below a lowermost internal electrode among the plurality of first internal electrodes 121 and the plurality of second internal electrodes 122. Also, the body 110 may further include an upper cover layer 111H disposed on an uppermost internal electrode among the plurality of first internal electrodes 121 and the plurality of second internal electrodes 122. The lower cover layer 111L and the upper cover layer 111H may be sintered together with the plurality of dielectric layers 111 and may be integrated such that boundaries between adjacent layers may not be distinct.

The lower cover layer 111L and the upper cover layer 111H may be formed by laminating a single dielectric layer 112/113 or two or more dielectric layers 112/113 in the third direction T (e.g., in the thickness direction of the body 110). The lower cover layer 111L and the upper cover layer 111H may prevent damage to the first internal electrode 121 and the second internal electrode 122 from physical/chemical stress. Also, to remove a mounting direction, the thickness TL of the lower cover layer 111L and the thickness TH of the upper cover layer 111H may be configured to be the same, but an example embodiment thereof is not limited thereto. The lower cover layer 111L or the upper cover layer 111H may have the same material and the same configuration as those of the dielectric layer 111, but an example embodiment thereof is not limited thereto.

The shape and the dimension of the body 110, the number of the laminated dielectric layers 111, the number of the laminated first internal electrode 121/the second internal electrode 122, and the thickness TL and TH of the lower/upper cover layers 111L and 111H may be varied in example embodiments, and are not limited to the illustrated examples.

The first external electrode 161 may include a first connection portion 161a, a first mounting portion 161b, and a first side portion 161c.

The first connection portion 161a may be disposed on the fifth surface C1 of the body 110 and may be connected to the plurality of first internal electrodes 121 exposed to the fifth surface C1. The first connection portion 161a may cover the entire fifth surface C1 of the body 110.

The first mounting portion 161b may extend from the first connection portion 161a to the first surface M1 and the second surface M2 of the body 110. The first mounting portion 161b may partially cover the first surface M1 and the second surface M2 of the body 110.

The first side portion 161c may extend from the first connection portion 161a to the third surface F1 and the fourth surface F2 of the body 110. The first side portion 161c may partially cover the third surface F1 and the fourth surface F2 of the body 110.

The first mounting portion 161b may be parallel to a plane formed by the first internal electrode 121, and the first side portion 161c may be perpendicular to a plane formed by the first internal electrode 121.

The first mounting portion 161b disposed on the first surface M1 of the body 110 and the first mounting portion 161b disposed on the second surface M2 of the body 110 may be symmetrical to each other in the third direction T around the body 110. For example, a length of the first mounting portion 161b disposed on the first surface M1 of the body 110 in the first direction L (or the second direction W) may be the same as a length of the first mounting portion 161b disposed on the second surface M2 of the body 110 in the in the first direction L (or the second direction W).

Similarly, the first side portion 161c disposed on the third surface F1 of the body 110 and the first side portion 161c disposed on the fourth surface F2 of the body 110 may be symmetrical to each other in the second direction W around the body 110. In other words, a length of the first side portion 161c disposed on the third surface F1 of the body 110 in the first direction L (or the third direction T) may be the same as a length of the first side portion 161c disposed on the fourth surface F2 of the body 110 in the first direction L (or the third direction T).

Similarly to the first external electrode 161, the second external electrode 162 may include a second connection portion 162a, a second mounting portion 162b, and a second side portion 162c.

The second connection portion 162a may be disposed on the sixth surface C2 of the body 110 and may be connected to the plurality of second internal electrodes 122 exposed to the sixth surface C2. The second connection portion 162a may cover the entire sixth surface C2 of the body 110.

The second mounting portion 162b may extend from the second connection portion 162a to the first surface M1 and the second surface M2 of the body 110. The second mounting portion 162b may partially cover the first surface M1 and the second surface M2 of the body 110.

The second side portion 162c may extend from the second connection portion 162a to the third surface F1 and the fourth surface F2 of the body 110. The second side portion 162c may partially cover the third surface F1 and the fourth surface F2 of the body 110.

The second mounting portion 162b may be parallel to a plane formed by the second internal electrode 122, and the second side portion 162c may be perpendicular to a plane formed by the second internal electrode 122.

The second mounting portion 162b disposed on the first surface M1 of the body 110 and the second mounting portion 162b disposed on the second surface M2 of the body 110 may be symmetrical to each other in the third direction T around the body 110. The second side portion 162c disposed on the third surface F1 of the body 110 and the second side portion 162c disposed on the fourth surface F2 of the body 110 may be symmetrical to each other in the second direction W around the body 110.

As described above, the first mounting portion 161b/the second mounting portion 162b formed on the first surface M1 of the body 110, and the first mounting portion 161b/the second mounting portion 162b formed on the second surface M2 of the body 110 may be symmetrical to each other, and the thickness TL of the lower cover layer 111L may be configured to be the same as the thickness TH of the upper cover layer 111H. Accordingly, when the electronic component 100 is mounted on the substrate, mounting directivity may be eliminated. In other words, the electronic component 100 may be mounted such that the first surface M1 of the body 110 may oppose the substrate, or such that the second surface M2 of the body 110 may oppose the substrate.

One side of the body 110 may be disposed in the first internal space IS1, and the other side of the body 110 may be disposed in the second internal space IS2.

The first external electrode 161 may define the first internal space IS1. The first internal space IS1 may be determined by the first connection portion 161a and the first mounting portion 161b and the first side portion 161c bent from the first connection portion 161a. A space surrounded by the first connection portion 161a, the first mounting portion 161b, and the first side portion 161c may be the first internal space IS1. Specifically, the first connection portion 161a may have a rectangular shape, and the first mounting portion 161b/the first side portion 161c may be bent perpendicularly from each side of the first connection portion 161a having the rectangular shape and may extend toward the second external electrode 162.

The second external electrode 162 may define the second internal space IS2. The second internal space IS2 may be determined by the second connection portion 162a and the second mounting portion 162b and the second side portion 162c bent from the second connection portion 162a. A space surrounded by the second connection portion 162a, the second mounting portion 162b, and the second side portion 162c may be the second internal space IS2. Specifically, the second connection portion 162a may have a rectangular shape, and the second mounting portion 162b/the second side portion 162c may be bent perpendicularly from each side of the second connection portion 162a having a rectangular shape and may extend toward the first external electrode 161.

Also, the first external electrode 161 and the second external electrode 162 may be symmetrical around a central portion of the body 110.

For example, the first mounting portion 161b of the first external electrode 161 disposed on the first surface M1 of the body 110 and the second mounting portion 162b of the second external electrode 162 disposed on the first surface M1 of the body 110 may be symmetrical to each other in the first direction L around the body 110. Also, the first side portion 161c of the first external electrode 161 disposed on the third surface F1 of the body 110 and the second side portion 162c of the second external electrode 162 disposed on the third surface F1 of the body 110 may be symmetrical to each other in the first direction L around the body 110. Also, the first connection portion 161a of the first external electrode 161 disposed on the fifth surface C1 of the body 110 and the second connection portion 162a of the second external electrode 162 disposed on the sixth surface C2 of the body 110 may be symmetrical to each other in the first direction L around the body 110.

By the first and second external electrodes 161 and 162, the fifth surface C1 and the sixth surface C2 of the body 110 may be entirely covered, but the first surface M1, the second surface M2, the third surface F1, and the fourth surface F2 may be partially exposed.

Each of the first external electrode 161 and the second external electrode 162 may include an electrode layer and a plating layer laminated in order.

The electrode layer 131 of the first external electrode 161 may be disposed on the entire fifth surface C1 of the body 110 and partially on the first surface M1, the second surface M2, the third surface F1, and the fourth surface F2 of the body 110. The electrode layer 132 of the second external electrode 162 may be disposed on the entire sixth surface C2 of the body 110, and partially on the first surface M1, the second surface M2, the third surface F1, and the fourth surface F2 of the body 110. The electrode layer 131 of the first external electrode 161 and the electrode layer 132 of the second external electrode 162 may be formed of substantially the same material and may have the same structure. The electrode layers 131 and 132 may include a conductive metal, such as at least one material among copper (Cu), nickel, gold, silver, platinum, palladium, or alloys thereof, for example, but an example embodiment thereof is not limited thereto. Also, the electrode layers 131 and 132 may further include glass as an auxiliary material. The conductive metal may guarantee chip sealing properties and electrical connectivity with a chip, and glass may fill an empty space when the conductive metal is backed and reduced, and may also provide a bonding force between the first external electrode 161 and the body 110.

The plating layer 151 may be disposed on the electrode layer 131 of the first external electrode 161 and the plating layer 152 may be disposed on the electrode layer 132 of the second external electrode 162. The plating layers 151 and 152 may be formed by electroplating based on the electrode layers 131 and 132 disposed below the plating layers 151 and 152. Accordingly, the plating layers 151 and 152 may have substantially the same pattern shape as that of the electrode layers 131 and 132 disposed below the plating layers 151 and 152.

The plating layer 151 of the first external electrode 161 and the plating layer 152 of the second external electrode 162 may be formed of substantially the same material and may have the same structure. The plating layers 151 and 152 may include a nickel (Ni) plating layer and/or a tin (Sn) plating layer. The plating layers 151 and 152 may include a nickel/tin alloy. In example embodiments, the plating layers 151 and 152 may include two or more layers. For example, the plating layers 151 and 152 may include a first plating layer formed on the electrode layers 131 and 132 including nickel, and a second plating layer formed on the first plating layer and including tin.

The electronic component 100 may include a sealing thin film ST ST_I and ST_O. The sealing thin film ST may be disposed on a surface of the structure including the body 110 and the electrode layer 131 or in the structure, and may prevent fluid from permeating into the structure. When the structure in which the electrode layers 131 and 132 are formed on the body 110, that is, the structure other than the plating layers 151 and 152 in the electronic component 100, is defined as a microbody, the sealing thin film ST may be disposed on the surface of the microbody and/or in the microbody. The sealing thin film ST may include an external sealing thin film ST_O disposed on the surface of the microbody and an internal sealing thin film ST_I disposed in the microbody.

The external sealing thin film ST_O may be disposed on a stepped portion STP formed by the body 110 and ends of the electrode layers 131 and 132 disposed on the body 110. The external sealing thin film ST_O may be disposed on an interfacial surface between the ends of the electrode layers 131 and 132 and the body 110 and may cover the interfacial surface. The external sealing thin film ST_O may be disposed on the first surface M1, the third surface F1, the second surface M2, and the fourth surface F2 of the microbody in which the ends of the electrode layers 131 and 132 may are disposed. The external sealing thin film ST_O may be continuously disposed to completely surround the interfacial surface between the ends of the electrode layers 131 and 132 and the body 110, but an example embodiment thereof is not limited thereto. The external sealing thin film ST_O may be intermittently disposed. A thickness (a maximum height measured in the vertical direction from the interfacial surface with the electrode layer 131 or the body 110) of the external sealing thin film ST_O may be 20 nm to 200 nm, but an example embodiment thereof is not limited thereto.

When the microbody includes microholes OP_H and OP_C disposed therein, the internal sealing thin film ST_I may be disposed in the microhole OP. In the description below, the sealing thin film ST and the microhole OP of the microbody will be described in greater detail.

Figure 5:
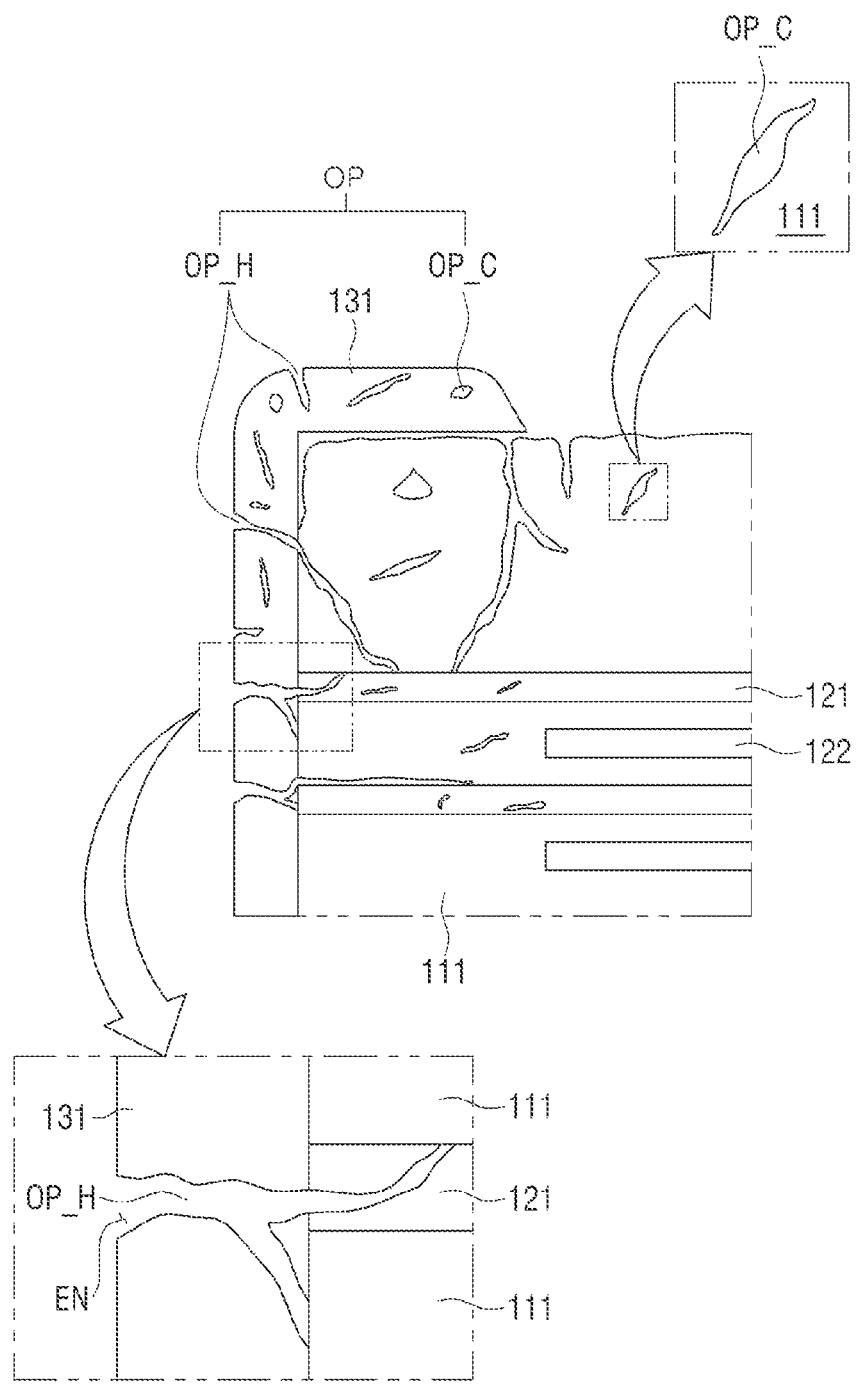
FIG. 5 is a cross-sectional diagram illustrating a portion of a microbody before a sealing thin film is formed according to an example embodiment.

FIG. 5 is a cross-sectional diagram illustrating a portion of a microbody before a sealing thin film is formed according to an example embodiment. In FIG. 5, a size and arrangement of the microhole OP may be exaggerated. Also, FIG. 5 illustrates a portion of the first external electrode 161 in which the electrode layer 131 is disposed, and the illustrated example shapes may also be applied to a portion of the second external electrode 162 in which the electrode layer 132 is disposed or the other portions.

Referring to FIGS. 4 and 5, the microbody of the electronic component 100 may include microholes OP therein. In one example, OP may collectively refer to the structures represented by OP_C and/or OP_H shown in the drawings. The microholes OP may be defined as spaces formed as an adjacently disposed material is not completely combined. Materials included in the microbody may be separated from each other based on the microholes OP. In other words, the microholes OP may form discontinuous sections of materials.

The microhole OP may be an empty space not occupied by a solid material, and may provide a space in which a fluid may stay or move. For example, a portion of the microholes OP may have a sufficient size such that a space through which a liquid such as a plating solution may pass. A portion of the other microholes OP may have a relatively small size, such that a space through which liquid may not pass but a gas may pass.

The microholes OP may be formed in a process of manufacturing the microbody. The microholes OP may be intentionally formed for a specific purpose, or may be formed unintentionally. For example, in the manufacturing process such as sintering and baking, it may be intended that the material forming the layer or the electrode may completely fill the space and may be solidified or cured, but due to various variables of process conditions or limitations of the adopted process conditions, there may be a defect in which a material may not fill a partial spaced. The defect may be disposed in the electronic component 100 in the form of the microhole OP. Also, the microhole OP may be formed by cracks generated during the process of manufacturing or handling of the microbody, or cracks caused by an external impact.

The microhole OP may have various shapes. For example, the microhole OP may have a shape such as a gap, a tunnel, a pore, or a puddle having a uniform or non-uniform width, and may have a form of lifting between interfacial surfaces. Also, the microhole OP may have an island shape such as a spherical shape, an oval shape, and an amorphous shape, and may have a connected linear shape, such as a linear line, a curved line, a tree branch, or a road. The microhole OP may be observed through an FE-SEM image.

The microhole OP may be disposed in various positions in the microbody.

For example, the microhole OP may be disposed in a specific member such as the dielectric layer 111 or the internal electrodes 121 and 122 of the body 110, or the electrode layer 131. Specifically, members such as the dielectric layer 111, the internal electrodes 121 and 122, and the electrode layer 131 may be provided in a paste state and may be formed by being solidified or cured through sintering and/or baking. The paste may be combined and integrated inmost areas by being sintered and/or baked, but in some cases, the combining may not occur in some areas or the paste may be combined and reseparated. The areas not combined may form the microhole OP.

As another example, the microhole OP may also be disposed on the interfacial surface between different members, such as the interfacial surface between the dielectric layer 111 and the internal electrodes 121 and 122, the interfacial surface between the dielectric layer 111 and the electrode layer 131, the interfacial surface between the internal electrode 121 and the electrode layer 131. Also, the microhole OP may be disposed on an interfacial surface of the same member, such as an interfacial surface between unit dielectric layers 111 derived from a ceramic sheet. In the process of manufacturing the microbody, different members may be solidified while being in close contact. Materials may be combined with each other on most of the interfacial surfaces, and no empty space may be created between the materials. However, when materials are not combined with each other on a portion of the interfacial surfaces, that is, when a specific layer is lifted from another layer, the corresponding space may form the microhole OP.

The microhole OP of the electronic component 100 may be disposed in one or more positions selected from the various positions listed above. Also, a single microhole OP of which a spaced is continuously formed may be disposed throughout two or more positions listed above. For example, a portion of the microholes OP may extend from the interfacial surface between the dielectric layer 111 and the internal electrodes 121 and 122 to the interfacial surface between the dielectric layer 111 and the electrode layer 131 by penetrating through the dielectric layer 111, and may penetrate through the electrode layer 131 and may be open on the external side surface of the electrode layer 131.

The microholes OP may be classified according to whether the microholes OP are open to the surface of the microbody. The surface of the microbody may include the surface of the electrode layer 131 and the surface of the body 110, and in the area in which the surface of the body 110 is covered by the electrode layer 131, the surface of the electrode layer 131 may become the surface of the microbody.

The microhole OP may include an open microhole OP_H in which a single microhole OP spatially continuously formed is open to the surface of the microbody, and a closed microhole OP_C in which a single microhole OP spatially continuously formed is not open through the surface of the microbody and an entire space thereof is closed. The distinction between the closed type and the open type may be based on the microhole OP defined by the microbody. In other words, the microhole OP may be defined by at least a portion of a material of the body 110 such as the dielectric layer 111 or the internal electrodes 121 and 122 and a material of the electrode layer 131. For example, when the microhole OP formed of a member such as the dielectric layer 111, the internal electrodes 121 and 122, and the electrode layer 131 is opened from the surface of the body 110 or the electrode layer 131, even though the opening is blocked by a thin film or a coating material, the opening may be a surface opening EN in terms of the microhole OP, and may thus be referred to as the open microhole OP.

Figure 6:
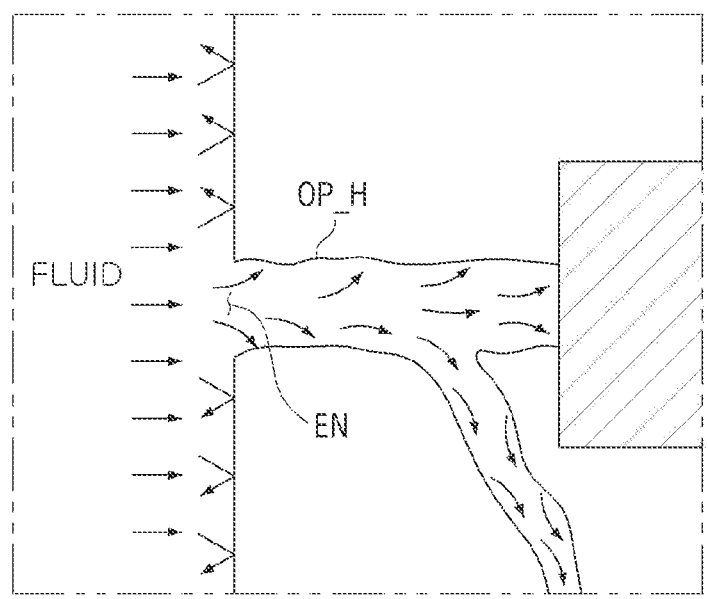
FIG. 6 is a diagram illustrating a state in which a microbody including open microholes are exposed to fluid.
Figure 7:
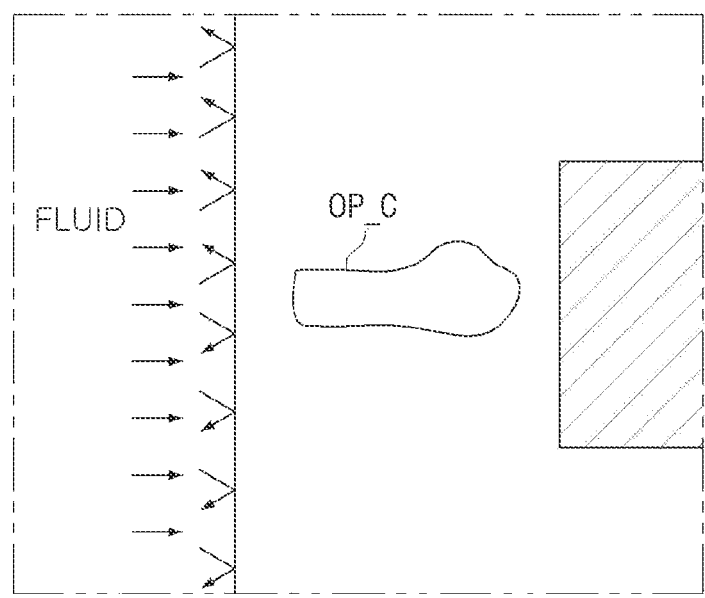
FIG. 7 is a diagram illustrating a state in which a microbody including closed microholes are exposed to fluid.

FIG. 6 is a diagram illustrating a state in which a microbody including open microholes are exposed to fluid. FIG. 7 is a diagram illustrating a state in which a microbody including closed microholes are exposed to fluid.

Referring to FIGS. 6 and 7, an intermediate structure (e.g., microbody) of the electronic component 100 in the manufacturing process or the surface of the manufactured electronic component 100 may be exposed to fluid. For example, the plating layer 151 of the electronic component 100 may be formed by, although not limited thereto, forming the electrode layer 131 on the body 110 and by an electroplating method of immersing the electrode layer in a plating solution. In this case, the microbody, an intermediate structure of the electronic component 100, may be exposed to a liquid plating solution. In addition to the actively immersing the layer in the liquid as described above, the electronic component 100 or the microbody thereof may be exposed to moisture in the atmosphere or other gases.

Since the closed microhole OP_C is not spatially connected to the surface of the microbody as illustrated in FIG. 7, permeation of fluid into the closed microhole OP_C may be prevented. As for the open microhole OP_H, as illustrated in FIG. 6, fluid may permeate into the open microhole OP_H through the surface opening EN. The fluid permeating into the microhole OP may enter the microbody in an extension direction of the microhole OP. The permeated fluid may be in contact with the dielectric layer 111, the internal electrodes 121 and 122, and/or the electrode layer 131 around the microhole OP, and may affect the member in contact. For example, when the permeating fluid is a plating solution, the plating solution may electrochemically react with the internal electrodes 121 and 122 or the electrode layer 131 and may change properties of the electrode. Also, by-products such as a hydrogen gas generated by the reaction may expand in volume and may create cracks in the microbody. Also, the permeating fluid may react with a dielectric, and may lower a dielectric constant or may generate by-products. As described above, when fluid is in contact with the member in the microbody, defects such as degradation in properties (e.g., breakdown voltage) of the electronic component 100 or cracks may occur. Such defects may be caused by the plating solution, and also by moisture (e.g., water vapor or moisture) or other gases permeating into the microhole OP.

The possibility of penetration of fluid by the open microhole OP_H may be effectively blocked by filling the open microhole OP_H with the sealing thin film ST blocking a flow path of the fluid.

Figure 8:
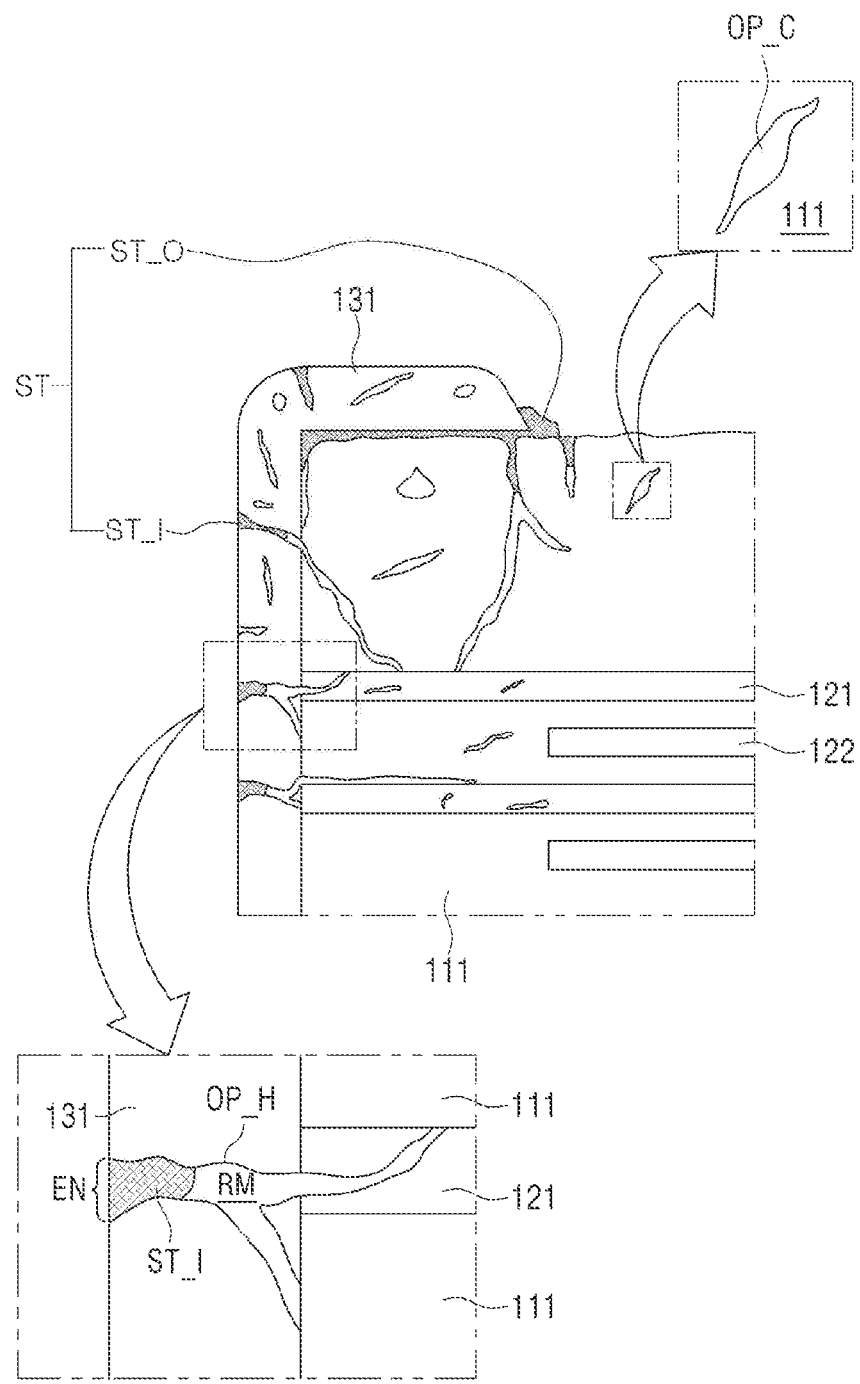
FIG. 8 is a cross-sectional diagram illustrating a portion of a structure in which a sealing thin film is formed on a microbody.
Figure 9:
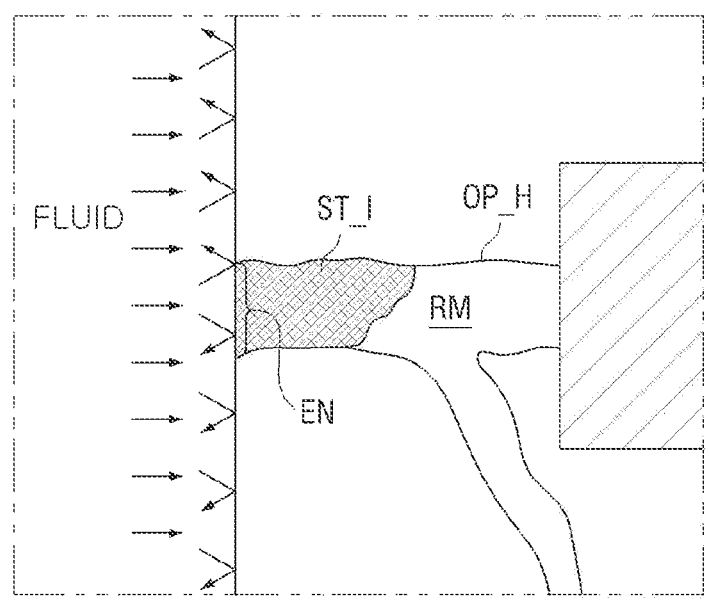
FIG. 9 is a diagram illustrating a state in which a microbody in which sealing thin films are formed in open microholes is exposed to fluid.

FIG. 8 is a cross-sectional diagram illustrating a portion of a structure in which a sealing thin film is formed on a microbody. FIG. 9 is a diagram illustrating a state in which a microbody in which sealing thin films are formed in open microholes is exposed to fluid.

Referring to FIG. 8, the electronic component 100 may include an internal sealing thin film ST_I and/or an external sealing thin film ST_O. FIG. 8 illustrates an example in which both the internal sealing thin film ST_I and the external sealing thin film ST_O are formed, but only the internal sealing thin film ST_I may be included or only the external sealing thin film ST_O may be included as the sealing thin film ST. Whether the internal sealing thin film ST_I is formed in the electronic component 100 having gone through the process of forming the sealing thin film ST may be determined by whether the microbody includes the open microhole OP_H. Whether the external sealing thin film ST_O remains and a thickness thereof may be determined according to a deposition thickness of the sealing thin film ST_ and a variable of a surface removal process. In one example, ST may collectively refer to the structures represented by ST_O ST_I, and/or ST_W shown in the drawings.

The internal sealing thin film ST_I may be disposed in the open microhole OP_H among the microholes OP. The internal sealing thin film ST_I may at least partially fill the internal space of the open microhole OP_H. For example, the internal sealing thin film ST_I may completely fill the internal space of the open microhole OP_H. When the internal sealing thin film ST_I entirely fills the internal space of the open microhole OP_H, the empty space may disappear, such that the flow passage of fluid may be blocked.

The internal sealing thin film ST_I may fill only a portion of the internal space of the open microhole OP_H. As illustrated in FIG. 9, the internal sealing thin film ST_I may not entirely fill the internal space of the open microholes OP_H and may define a void, which may be an empty space RM. By closing the opening of the open microhole OP_H adjacent to the surface for the fluid to not be able to move, the open microhole OP_H may be in the same state as the closed microhole OP_C in terms of the flow passage of the fluid, such that the fluid may be prevented from entering the open microhole OP_H from the surface.

The external sealing thin film ST_O may be disposed on an interfacial surface between the end of the electrode layer 131 and the body 110. The external sealing thin film ST_O may seal the interfacial surface between the end of the electrode layer 131 and the body 110 and may block the fluid flow path. When the open microhole OP_H extends to the interfacial surface between the body 110 and the electrode layer 131, the sealing thin film ST may grow into the open microhole OP_H. In this case, the external sealing thin film ST_O and the internal sealing thin film ST_I may be connected to each other.

The sealing thin film ST may be deposited by a vapor deposition process on the surrounding members (the dielectric layer 111, the internal electrodes 121 and 122, electrode layer 131), and may be at least partially bonded to the surrounding members. The bonding may include a chemical bonding. The chemical bonding may provide a stronger bonding force with the surrounding members than an organic coating layer formed through a coating and curing process.

The sealing thin film ST may have crystallinity. Specifically, the sealing thin film ST may be entirely or at least partially crystallized through a deposition process. The crystallized sealing thin film ST may form a mechanically more robust film than an organic coating layer formed through a coating and curing process, and may have a better sealing function, such that fluid permeation may be effectively blocked.

The sealing thin film ST may include a water repellent material. The contact angle of the sealing thin film ST may be 90° to 110°, for example, but an example embodiment thereof is not limited thereto. When the sealing thin film ST has water repellency, fluid such as a plating solution or moisture may be effectively prevented from permeating into the microbody.

In an example embodiment, the sealing thin film ST may include fluorine. Specifically, the sealing thin film ST may include a fluorine-based organic material such as $C_xF_y$. An average thickness of the sealing thin film ST may be different depending on a position thereof, but a maximum thickness thereof may be adjusted within a range of 20 nm to 200 nm. The maximum thickness may be measured by, for example, an optical microscope or a scanning electron microscope (SEM). Other methods and/or tools appreciated by one of ordinary skill in the art, even if not described in the present disclosure, may also be used.

In the description below, the sealing thin film ST will be described in greater detail while a method of manufacturing the electronic component 100 is described.

FIGS. 10, 11, 13, 15, and 16 are cross-sectional diagrams illustrating processes of a method of manufacturing an electronic component according to an example embodiment.

Figure 10:
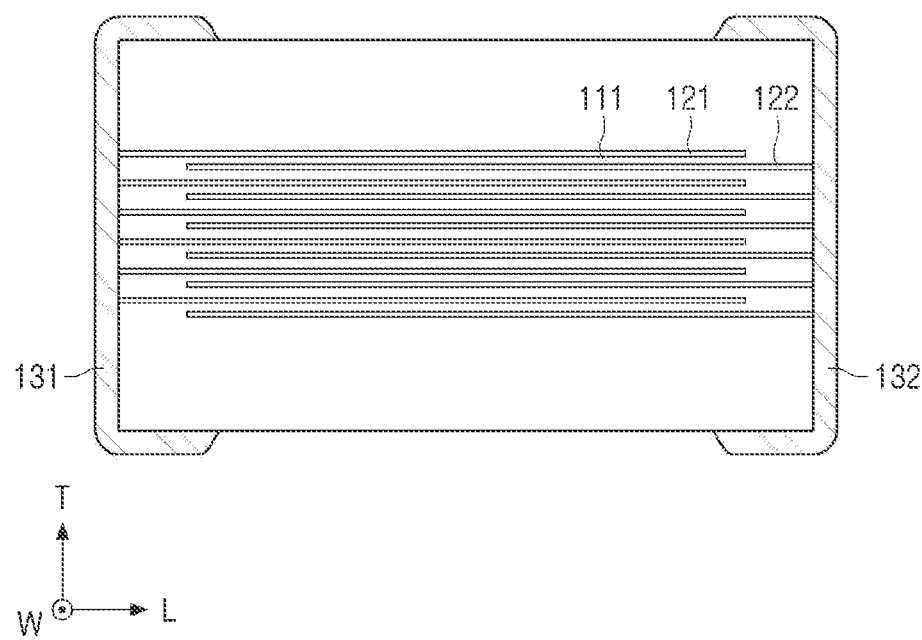
FIGS. 10, 11, 13, 15, and 16 are cross-sectional diagrams illustrating processes of a method of manufacturing an electronic component according to an example embodiment.

Referring to FIG. 10, a microbody including a body 110 and an electrode layer 131 may be provided. The microbody may be manufactured by forming the body 110 and forming the electrode layer 131 on the body 110.

The body 110 may be formed using generally used methods. For example, a plurality of ceramic green sheets may be prepared, and a conductive paste may be applied to each ceramic green sheet using a printing method such as a screen printing method or a gravure printing method. The plurality of ceramic green sheets may be laminated, the ceramic green sheet laminated by being compressed in a lamination direction and the conductive paste for the internal electrodes 121 and 122 may be compressed with each other. The laminate bodies compressed with each other may be cut for each region corresponding to the body 110 of a single multilayer capacitor, thereby completing the non-sintered body.

Subsequently, a binder may be burnt by performing a heat treatment on the body, and baking is performed in a reducing atmosphere, thereby obtaining the sintered and/or baked body 110.

Subsequently, the electrode layer 131 may be formed on the body 110. The electrode layer 131 may be formed by applying, on the body 110, a conductive paste or a conductive epoxy resin including conductive material powder such as at least one material among copper (Cu), nickel, gold, silver, platinum, and palladium, or alloys thereof, and glass powder, and baking by performing a heat treatment to provide electrical properties.

As described above, the microbody after sintering and/or baking the body 110 and the electrode layer 131 may include the microhole OP therein. When the plurality of microbodies are manufactured, a portion of the microbody may include microholes OP, and the other portion of the microbody may not include the microholes OP. A portion of the microbodies including the microholes OP may include only the closed microhole OP_C without the open microhole OP_H, and a portion of the other microbody may only include the open microhole OP_H without the closed microhole OP_C. The other microbody may include both the open microhole OP_H and the closed microhole OP_C.

As for the microbody without the microhole OP or only including the closed microhole OP_C without the open microholes OP_H, permeation of the plating solution and permeating into the microbody may not occur even in the immersion in the plating solution in a subsequent plating process, the process of forming the sealing thin film ST for preventing permeation of fluid may not be necessary. As for the microbody including the open microholes OP_H, the process of forming the sealing thin film ST for preventing permeation of fluid may be employed preferably.

After the microbody is manufactured, in the case in which whether the open microhole OP_H is included is identified through an inspection process, it may be effective to perform the process of forming the sealing thin film ST by only selecting the microbody including the open microhole OP_H. However, since the microbody has a small size, it may not be easy to inspect whether the open microhole OP_H is present, and process costs may also be high. Also, even when the microbody including the open microhole OP_H is identified, selectively selecting the microbodies from various microbodies may also be inefficient in terms of process. Rather, by performing the process of forming the sealing thin film ST for all the microbodies manufactured without the inspection and the selection process for the open microhole OP_H, a defect rate of the entire process may be reduced, and process efficiency may improve. When the sealing thin film ST is formed on a microbody which does not include an open microhole OP_H, only the external sealing thin film ST_O may be formed without the internal sealing thin film ST_I, and since the external sealing thin film ST_O may perform a function of preventing permeation of fluid between the body 110 and the electrode layer 131 in the completed electronic component 100 as well as the plating process, reliability of the electronic component 100 may improve without any side effects.

Thus, the method of manufacturing the electronic component 100 according to an example embodiment may include a process of forming the sealing thin film ST performed without an inspection process for the presence of the open microhole OP_H with respect to the microbody having gone through the baking.

Figure 11:
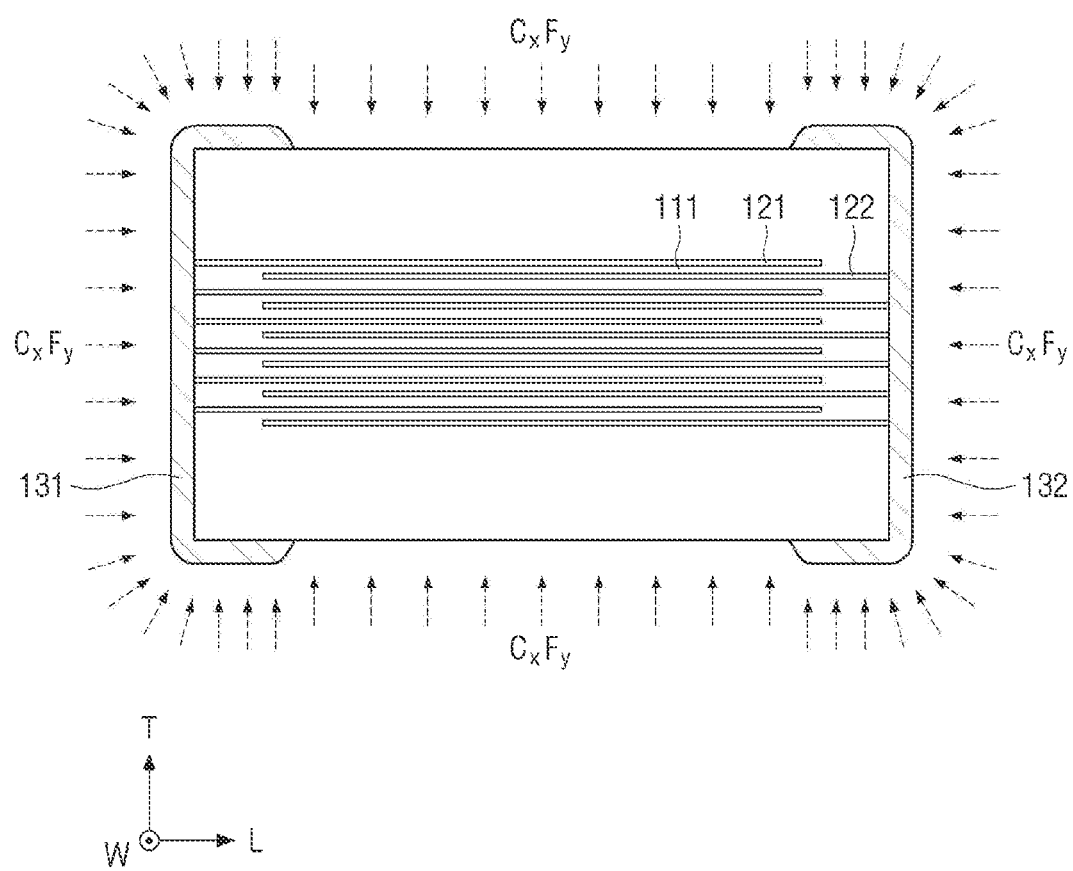

Referring to FIG. 11, the process of forming the sealing thin film ST may be performed by a vapor deposition process such as CVD, PECVD (or plasma deposition apparatus), PVD, ALD, or the like. As for the process of forming the sealing thin film ST is performed by PECVD as an example, a microbody may be disposed in a PECVD equipment. As a source gas, a $C_xF_y$ gas such as $C_3F_6$ may be used, for example. When the deposition process is performed by forming plasma in the PECVD equipment and, the $C_xF_y$ material may be deposited on the surface of the microbody.

The thickness of the sealing thin film ST may be related to a deposition direction. In general, when a surface to be deposited opposes an electric field direction of a shower head of a PECVD equipment and a plasma generating device, a thickness of the sealing thin film ST may increase. The microbody may have a rectangular parallelepiped shape, and for example, when the second side M2 opposes the shower head of the PECVD equipment, and the first side M1, an opposite surface, opposes the floor, a sealing thin film ST having a sufficient thickness may be formed on the second surface the shower head M2, while a sealing thin film ST having a smaller thickness may be formed on the third to sixth surfaces F1, F2, C1, and C2 perpendicular to the second surface M2. When the first surface M1 is in contact with a member such as a support or a seating portion of the PECVD equipment, the sealing thin film ST may be rarely formed on the first surface M1.

While which surface of the microbody the open microhole OP_H is to be open is not determined, a film having a uniform thickness may be formed on overall surfaces of the microbody for stable sealing of the open microhole OP_H preferably. As one of methods for forming a uniform film, a method of performing a deposition process while changing a position of each surface without fixing an opposing surface of the microbody to the shower head may be adopted.

Figure 12:
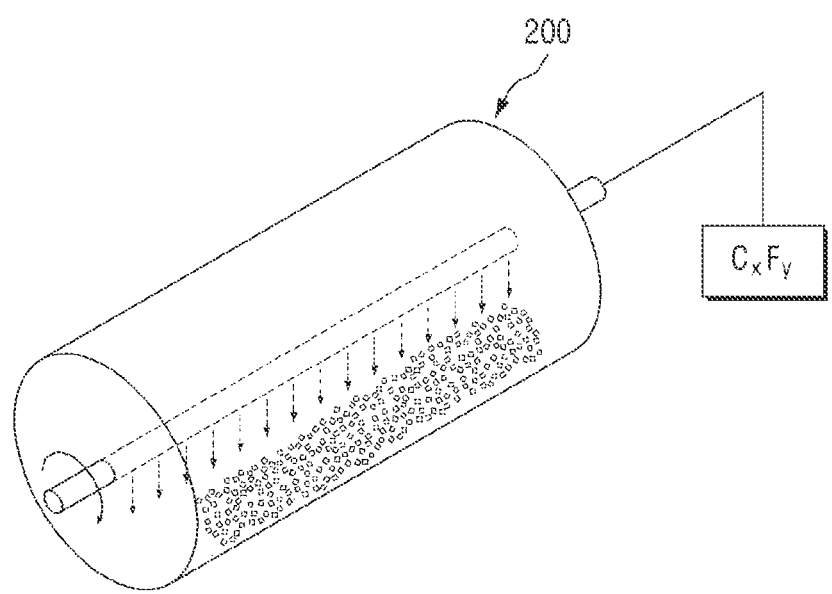
FIG. 12 is a diagram illustrating a process of forming a sealing thin film of an electronic component according to an example embodiment.

An example method of changing a surface to be deposited is illustrated in FIG. 12. FIG. 12 is a diagram illustrating a process of forming a sealing thin film of an electronic component according to an example embodiment. FIG. 12 illustrates a rotary deposition process in which a deposition process is performed while a plurality of microbody rotate in a barrel-type PECVD equipment 200. As illustrated in FIG. 12, when the microbody is disposed in a barrel and a deposition process is performed while rotating the barrel, each surface of the microbody may rotate regularly or randomly, such that deposition may be uniformly performed on overall surfaces of the microbody.

Figure 13:
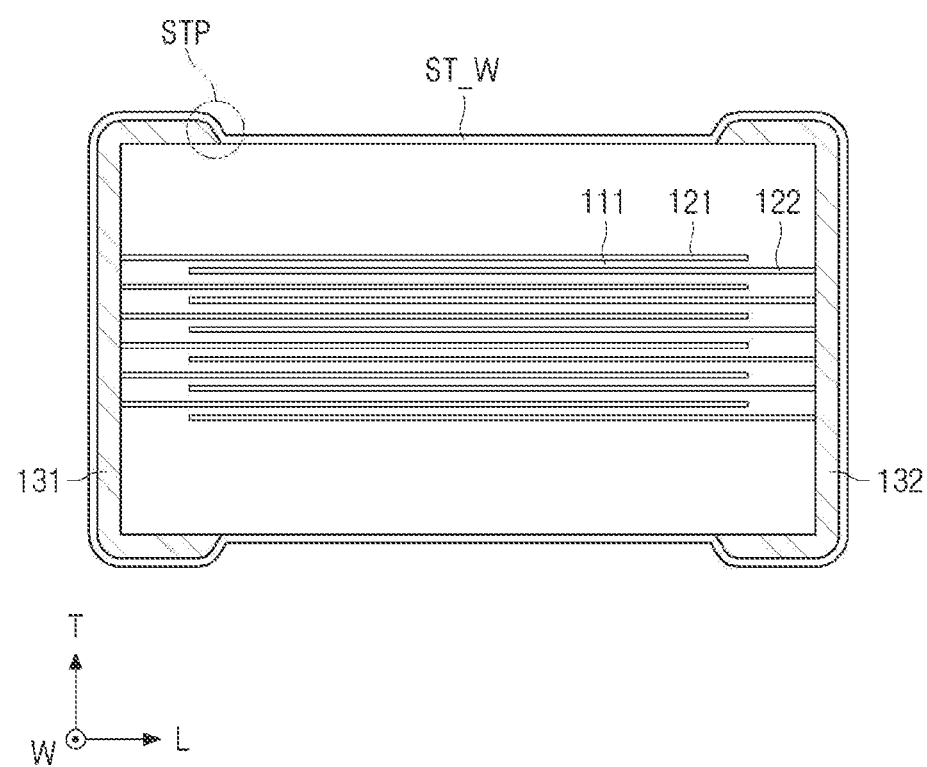

Referring to FIG. 13, a deposition material $C_xF_y$ in the PECVD equipment may be deposited on the microbody, may be bonded, may grow in a thickness direction, and may be formed as a sealing thin film ST_W. The sealing thin film ST_W may be formed on an entire surface of the microbody in terms of an exterior. In other words, the sealing thin film ST_W may be formed on an exposed portion of the electrode layer 131 and the body 110 not being covered by the electrode layer 131. The sealing thin film ST_W may be formed to cover the surface (external side surface) of the exposed dielectric layer 111 of the body 110 and also the entire surface (external side surface) of the exposed electrode layer 131. A stepped portion STP corresponding to the thickness of the electrode layer 131 may be defined between an end of the electrode layer 131 and the body 110, and the sealing thin film ST_W may be conformally formed along the stepped portion STP.

The sealing thin film ST_W may have a uniform thickness throughout the entire surface of the microbody. The thickness of the deposited sealing thin film ST_W may be adjusted through process time or condition control. An average thickness of the sealing thin film ST_W deposited on the microbody may be determined within a range in which an opening of the open microhole OP_H may be sufficiently closed. The thickness of the sealing thin film ST_W satisfying the above condition may be varied depending on a size of the open microhole OP_H. However, according to the experiment on a number of microbodies formed under general process conditions, when the average thickness of the sealing thin film ST_W is determined to be in the range of 20 nm to 200 nm, the deterioration of the electronic component 100 caused by fluid permeation was reduced.

Figure 14:
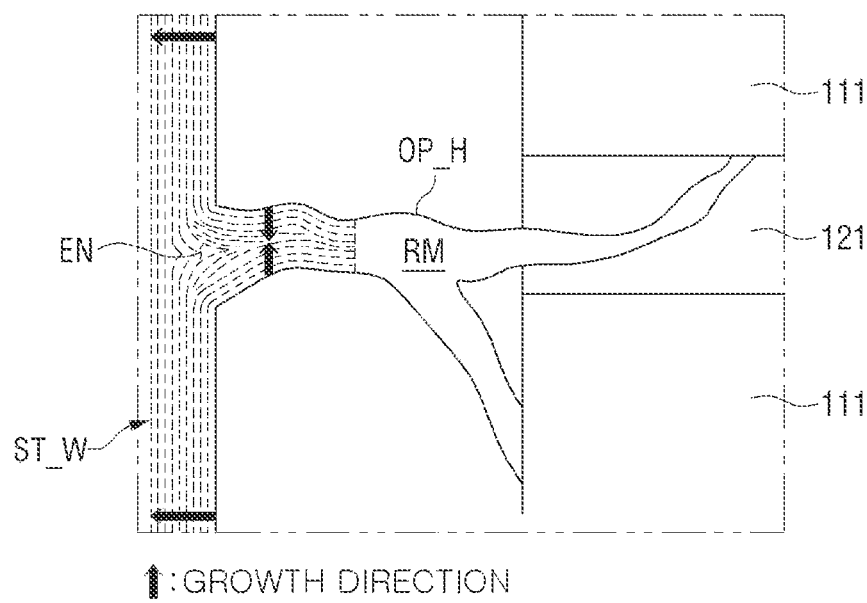
FIG. 14 is a cross-sectional diagram illustrating a growth direction of a sealing thin film.

FIG. 14 is a cross-sectional diagram illustrating a growth direction of a sealing thin film. Referring to FIG. 14, in the PECVD deposition equipment, a microbody may be exposed to a vapor deposition material. When the deposition material meets the surface of the microbody, the material may be bonded to the surface of the microbody. The vapor deposition material may be in contact with and bonded to the external side surface of the exposed microbody. Also, since the vapor deposition material may permeate into the open microhole OP_H, the material may be in contact with and may be bonded to the internal wall of the open microhole OP_H.

When the deposition process continues, the vapor deposition material may be in contact with and bonded to the deposition material pre-bonded to the microbody. Through this process, the sealing thin film ST may grow. As illustrated in FIG. 14, generally, the main growth direction of the sealing thin film ST may be perpendicular to the surface to be deposited.

On the external side surface of the microbody, the sealing thin film ST_W may grow in the external direction. Since there is no structure that may impede the growth on the external side surface of the microbody, the sealing thin film ST_W may grow to a thickness corresponding to a predetermined thickness.

As for the open microhole OP_H, the sealing thin film ST_W may grow in a vertical direction from the internal wall. The sealing thin film ST_W may grow from an entire internal circumference of the internal wall of the open microhole OP_H toward a center thereof.

As the sealing thin film ST_W grows in the open microhole OP_H, the empty space RM in the open microhole OP_H may gradually decrease. Even when the size of the empty space RM is reduced, a vapor deposition material may communicate with an internal and external portion of the open microhole OP_H through the empty space RM as long as the space remains. Accordingly, a film may be additionally formed in the internal space of the region in which the film is formed.

As the sealing thin film ST_W further grows in the open microhole OP_H, the film may be in contact with the sealing thin film ST_ which may grow in opposite. The condition in which the sealing thin films ST_W growing in different directions on the internal wall of the open microhole OP_H may be in contact with each other during the deposition process may relate to a determined thickness (a thickness with reference to the external side surface) of the film and a minimum internal diameter of the open microhole OP_H. For example, when it is assumed that speeds of formation of the film are the same in the external side surface of the microbody and in the open microhole OP_H, and the internal diameter of the open microhole OP_H is less than or equal to half the determined thickness of the film, the sealing thin films ST_W growing in different directions on the internal wall of the microhole OP_H T may be in contact with each other. When the speed of the formation of the film in the open microhole OP_H is ½ of the external side surface, the condition in which the internal diameter of the open microholes OP_H is less than the determined thickness of the film may be a necessary condition for the sealing thin films ST W in the open microhole OP_H to be in contact with a central portion. In other words, the thickness of the sealing thin film ST_W may be determined such that the open microhole OP_H may be closed through a deposition process at least inconsideration of the size of the o open microhole OP_H and the speed of the formation of the film therein.

The sealing thin films ST_W in contact with each other may be bonded to each other on a connection portion. When the sealing thin films ST_W growing opposite to each other are completely bonded without any gaps, a space may be closed in the region. Therefore, even the vapor deposition material may not enter the closed area after that, and accordingly, the film may not further be formed. When the empty space RM remains in the closed area at the time of the closing, the internal empty space RM may remain as is even when the deposition process continues thereafter. When the empty space RM connected to the opening of the open microhole OP_H remains externally of the closed area at the time of the closing, the film may be continuously formed unless an additional opening is closed.

Figure 15:
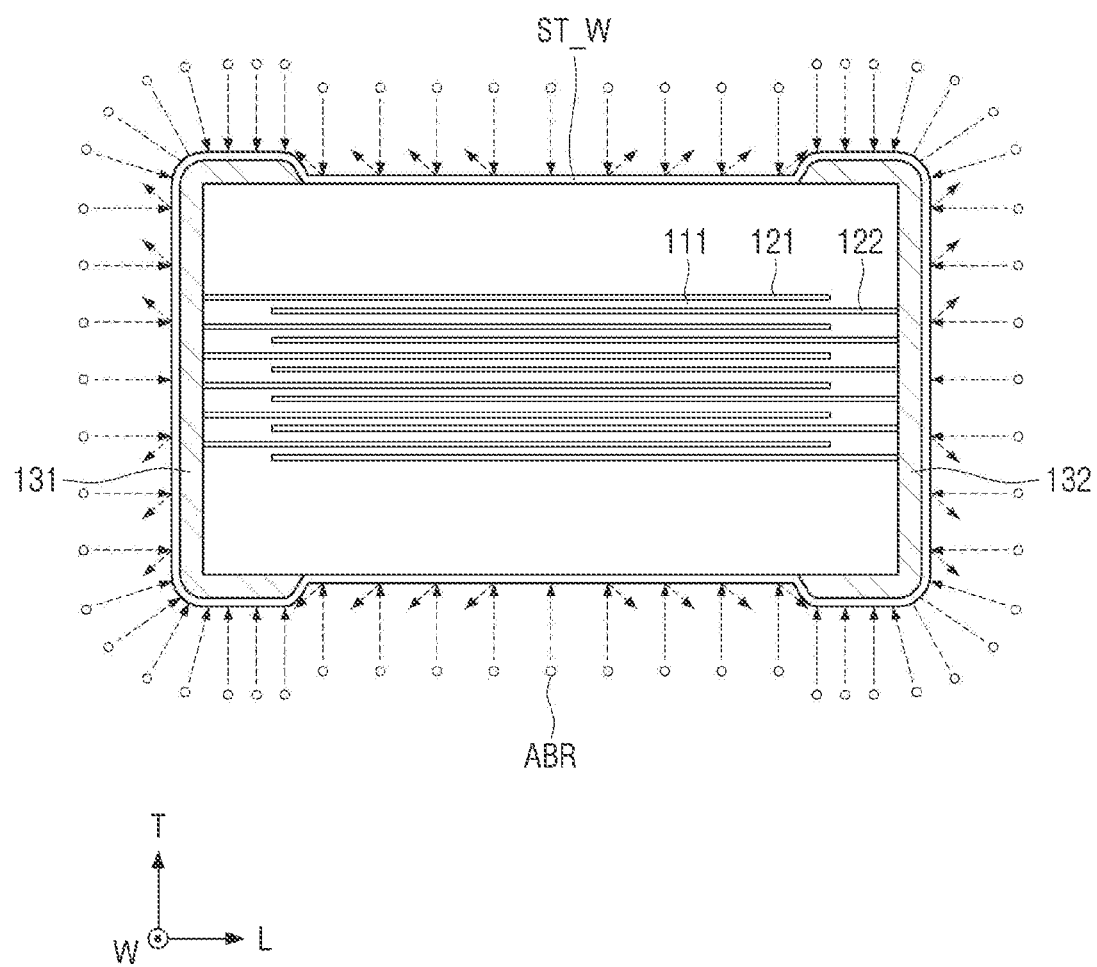

Referring to FIG. 15, a process of removing the sealing thin film ST_W may be performed after the process of forming the sealing thin film ST_W. The process of removing the sealing thin film ST_W may be a process of at least partially removing the sealing thin film ST_W. The process of removing the sealing thin film ST_W may be performed to remove the sealing thin film ST_W disposed on the electrode layer 131. A plating layer 151 may be formed on the electrode layer 131, and when the electrode layer 131 is covered by the sealing thin film ST_W, it may be difficult to perform the plating process smoothly. Also, when the sealing thin film ST_W remains on the electrode layer 131, electrical resistance between the plating layer 151 and the electrode layer 131 disposed thereon may increase. Accordingly, by removing the sealing thin film ST_W covering the electrode layer 131 through this process, a subsequent plating process may be smoothly performed, and an increase in electrical resistance between the electrode layer 131 and the plating layer 151 may be prevented.

The process of removing the sealing thin film ST_W may be performed under the condition in which the sealing thin film ST_W formed in the open microhole OP_H remains. When the sealing thin film ST_W formed in the open microhole OP_H is also removed, permeation of the plating solution in the subsequent plating process may not be prevented. Therefore, a removal process which may remove the sealing thin film ST_W formed on the external side surface of the microbody and may simultaneously remain the sealing thin film ST_W formed in the open microhole OP_H may be selected.

Dry polishing may be an example of the process of removing the sealing thin film ST_W which may satisfy the above conditions. Mechanical (or physical) polishing may be an example of dry polishing. The mechanical polishing process may be performed by physically separating the sealing thin film ST_W by colliding abrasive particles ABR with the microbody on which the sealing thin film ST_W is formed.

The mechanical polishing process may be performed in the barrel. In other words, a plurality of microbodies on which the sealing thin films ST are formed may be disposed in the barrel, and the abrasive particles ABR (or abrasives) may collide with the microbody while the microbody rotates by rotating the barrel. As for a barrel polishing method, overall surfaces of the microbody may be uniformly polished, and also the polishing may be performed simultaneously on the plurality of microbody, thereby improving process efficiency. In addition to the barrel polishing, various mechanical polishing processes generally used in the respective field, such as sand blasting, may be applied for the process of partially removing the sealing thin film ST_W.

The abrasive particles ABR may be formed of inorganic materials such as sand, glass, metal, or resin such as silicon, but an example embodiment thereof is not limited thereto, and abrasive particles ABR of various materials used for mechanical polishing may be applied.

The shape of the abrasive particles ABR may be spherical, oval, or the like, but an example embodiment thereof is not limited thereto, and various shapes such as amorphous may be applicable as the shape of the abrasive particles ABR.

The size of the abrasive particles ABR may be, although not limited thereto, 1 mm or less. In example embodiments, the diameter of the abrasive particles ABR may be in the range of 0.5 mm to 0.8 mm. For example, abrasive particles ABR having an average diameter of 0.7 mm or 0.6 mm may be used in the mechanical polishing process.

Polishing conditions including the polishing time may be determined as a condition in which the overall sealing thin film ST_W formed on the metal layer is removed and the electrode layer 131 is exposed.

Figure 16:
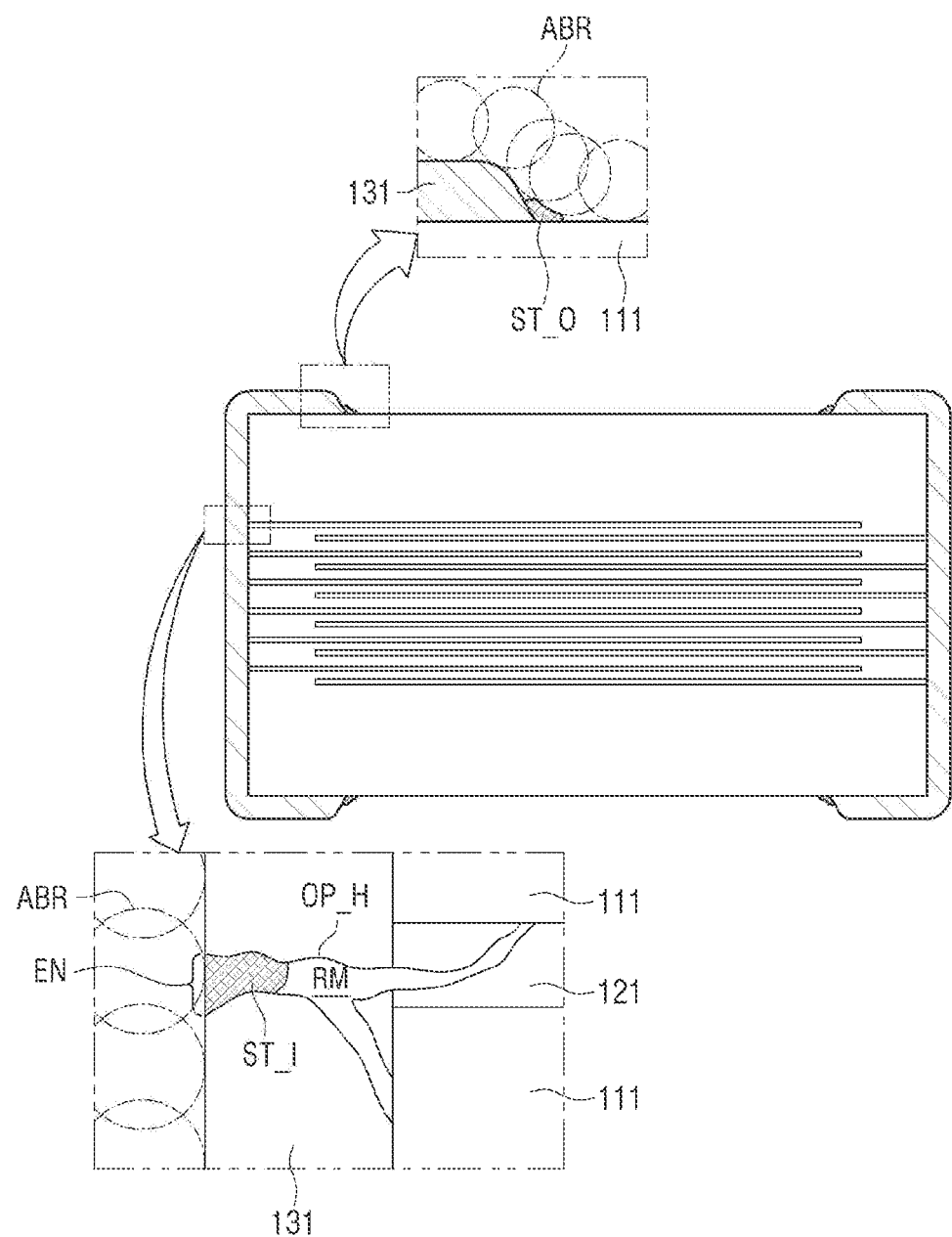

FIG. 16 is a cross-sectional diagram illustrating a microbody having gone through a process of partially removing a sealing thin film.

Referring to FIG. 16, most of the sealing thin film formed on the external side surface of the microbody may be removed through the process of removing the sealing thin film, and the external side surface of the microbody may be exposed. Since there is no direct impact on the sealing thin film formed in the open microhole OP_H by the abrasive particles ABR, the sealing thin film may remain without being removed. The sealing thin film remaining in the open microhole OP_H may become the above-described internal sealing thin film ST_I.

In the stepped portion STP between the end of the electrode layer 131 and the body 110, the side surface of the electrode layer 131 may act as a shadow for the abrasive particles ABR. Also, since the abrasive particles ABR have a predetermined size, an internal edge portion of the stepped portion STP having a relatively narrow width may not be exposed to a physical impact by the abrasive particles ABR. Accordingly, the sealing thin film disposed on the interfacial surface between the end of the electrode layer 131 and the body 110 may not be removed despite the mechanical polishing, and at least a portion thereof may remain. The sealing thin film ST remaining on the interfacial surface between the end of the electrode layer 131 and the body 110 may become the external sealing thin film ST_O described above. The maximum thickness of the external sealing thin film ST_O may be substantially the same as the formed thickness of the sealing thin film ST_W.

After the process of removing the sealing thin film, a plating layer 151 may be formed on the electrode layer 131, thereby forming the electronic component 100 as illustrated in FIG. 4. The plating layer 151 may be performed by a plating process in which the microbody is immersed in a plating solution. Through the process of removing the sealing thin film, the sealing thin film on the external side surface of the electrode layer 131 may be removed and the external side surface of the electrode layer 131 may be exposed, such that the plating layer 151 may be formed smoothly. Also, since the open microhole OP_H of the microbody are closed by the internal sealing thin film ST_I, the plating solution may be blocked from entering the microbody through the open microhole OP_H. Also, since the external sealing thin film ST_O is formed on the interfacial surface between the end of the electrode layer 131 and the body 110, the internal penetration of the plating solution through the interfacial surface may be prevented.

The above-described internal sealing thin film ST_I may be disposed in the open microhole OP_H in various forms depending on the shape and the size of the open microhole OP_H, and process conditions for forming the sealing thin film. Several examples of the internal sealing thin film ST_I are illustrated in FIG. 17.

Figure 17:
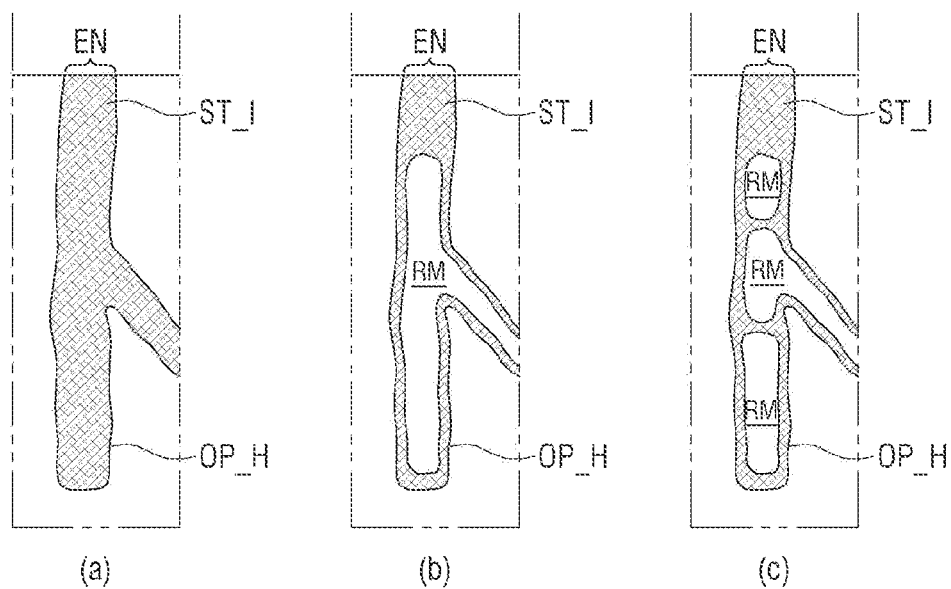
FIG. 17 is cross-sectional diagrams illustrating an internal sealing thin film of an electronic component according to example embodiments.

FIG. 17 is cross-sectional diagrams illustrating an internal sealing thin film of an electronic component according to example embodiments.

(a) in FIG. 17 illustrates a form in which the internal sealing thin film ST_I is completely filled in the open microhole OP_H. In the process of forming the sealing thin film ST, when the deposition material is spread evenly into the open microhole OP_H, and growth occurs sequentially from an internal side, the form as illustrated in (a) in FIG. 17 may be formed. When the internal sealing thin film ST_I completely fills the open microhole OP_H as above, the internal sealing thin film ST_I may have high mechanical strength.

(b) in FIG. 17 illustrates an example in which a predetermined section from the surface opening EN of the open microhole OP_H may be filled with the internal sealing thin film ST_I, thereby defining a closed area, whereas a void, the empty space RM, may remain on an internal side of the closed area. When the opening is closed before the deposition material completely fills the internal space of the open microhole OP_H, the internal sealing thin film ST_I as in (b) in FIG. 7 may be formed.

(c) in FIG. 17 illustrates an example in which two or more closed areas are formed such that two or more empty spaces RM separated from each other remain in the open microhole OP_H. When the first closing is performed in a relatively deep position, and the second closing and third closing are sequentially performed in a shallower position, the internal sealing thin film ST_I as in (c) in FIG. 17 may be formed.

In the example in which the open microhole OP_H is completely filled with the internal sealing thin film ST_I as in (a) in FIG. 17, and also in the example in which a void, the empty space RM, is formed in the open microhole OP_H as in (b) and (c) in FIG. 17, as the opening of the open microhole OP_H is closed, permeation of fluid such as a plating solution may be prevented. Also, the void included in (b) and (c) in FIG. 17 may relieve stress applied by an external impact of the electronic component 100 or expansion of a member along with the closed microhole OP_C.

Since a vapor deposition method is used in the above-described example embodiments to form the internal sealing thin film ST_I, fluid permeation may be blocked by effectively closing the opening of the open microhole OP_H. The vapor deposition method may have an advantage as compared to a method of forming a coating layer by a wet method in terms of reliability of blocking the opening of the open microhole OP_H, which will be described in greater detail in the description below.

Figure 18:
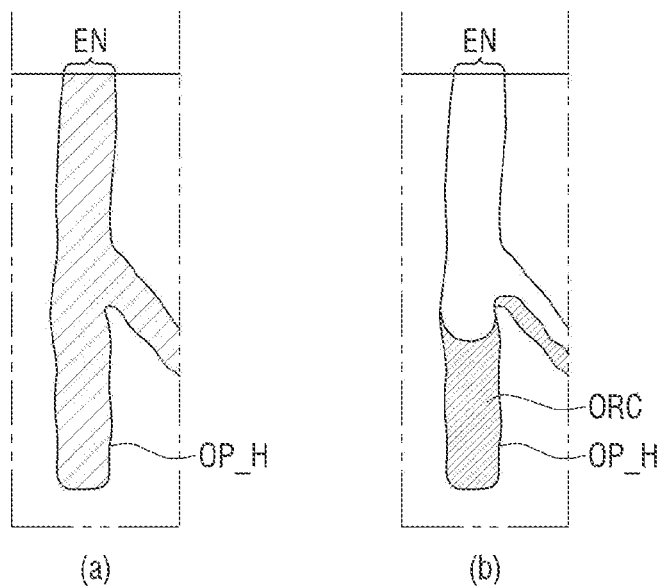
FIG. 18 is cross-sectional diagrams illustrating a method of forming a coating layer in an open microhole by a wet method.

FIG. 18 is cross-sectional diagrams illustrating a method of forming a coating layer in an open microhole by a wet method. The method of forming the coating layer by the wet method may include filling the open microhole OP_H with an organic composition ORL as a coating composition (see (a) in FIG. 18), and drying and/or curing the organic composition ORL (see (b) in FIG. 18).

The organic composition ORL may be provided in a liquid form. The process of filling the organic composition ORL in the open microholes OP_H may be performed by immersing the microbody in the liquid organic composition ORL. A drying and/or curing process may be necessary for the organic composition ORL to remain as an organic coating layer ORC. The liquid component of the organic composition ORL may be evaporated or volatilized through the drying and/or curing process, and the solid component may remain, thereby forming the coating layer ORC. The volume of the organic composition ORL may decrease while going through the above process. As illustrated in (b) in FIG. 18, the solid content may not remain in the opening of the open microhole OP_H, which may become a passage through which the liquid component is evaporated. In this case, although the internal deep portion of the open microhole OP_H may be filled by the coating layer ORC, the surface opening EN may still be in an open state. Therefore, even after the coating layer ORC is formed, the fluid permeation passage in the microbody may not be completely blocked.

In the case of the internal sealing thin film ST_I illustrated in FIG. 17, although the empty space RM is formed in the open microhole OP_H, at least the surface opening EN of the open microhole OP_H may be firmly closed. Therefore, improved sealing reliability may be obtained.

Figure 19:
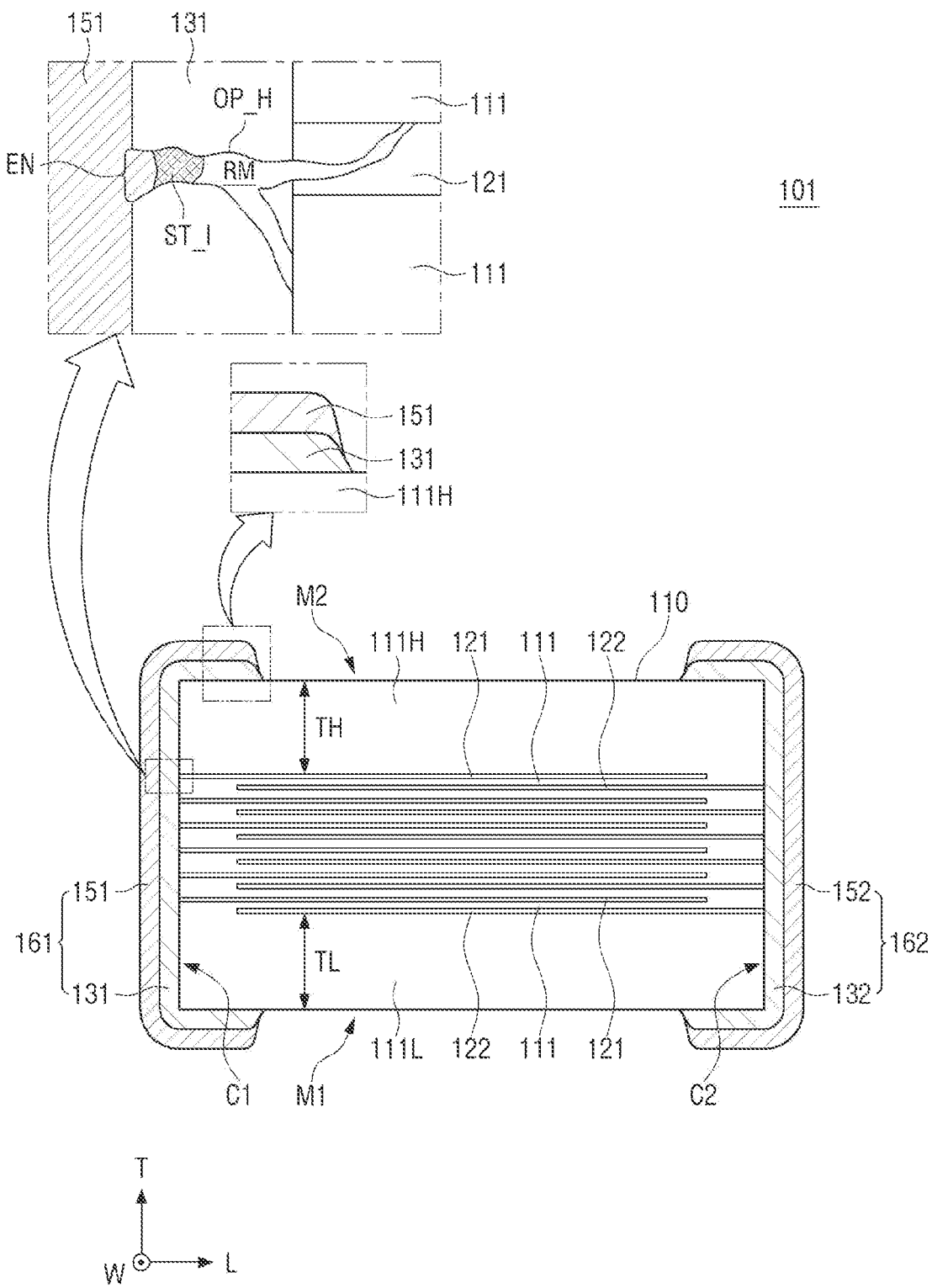
FIG. 19 is a cross-sectional diagram illustrating an electronic component according to another example embodiment.

FIG. 19 is a cross-sectional diagram illustrating an electronic component according to another example embodiment.

Referring to FIG. 19, the electronic component 101 in the example embodiment may be different from the example embodiment in FIG. 4 in that the external sealing thin film ST_O is not included, and the internal sealing thin film ST_I may be retreated from the surface opening EN of the open microhole OP_H by a predetermined distance. The end of the internal sealing thin film ST_I may be disposed at a predetermined depth from the surface opening EN of the open microhole OP_H, and may form a closed section at least in the disposed region. Accordingly, the fluid may permeate into a groove portion defined by the open microhole OP_H and the internal sealing thin film ST_I, but further permeation into the internal space thereof may be prevented. The distance by which the internal sealing thin film ST_I retreats from the surface opening EN of the open microhole OP_H may be 100 nm or less, but an example embodiment thereof is not limited thereto. When the surface opening EN of the open microhole OP_H is disposed in the electrode layer 131, the plating layer 151 may fill the space in which the internal sealing thin film ST_I is retracted.

The electronic component 101 illustrated in FIG. 19 may be manufactured the same method as in the aforementioned example embodiment, but the process of removing the sealing thin film may be replaced with dry etching or wet etching, instead of the dry polishing.

As an example of the wet etching process, when the resulted product in FIG. 13 is immersed in an etching solution or an etching solution is sprayed, the sealing thin film ST_W may be etched through the entire surfaces of the microbody. The thickness by which the sealing thin film ST_W is etched may be substantially proportional to the time for which the film is exposed to the etching solution, that is, the etching time. The etching time may be determined to remove the entire sealing thin film ST_W on the electrode layer 131. When the entire sealing thin film ST W on the electrode layer 131 is removed, the sealing thin film ST_W disposed on the other surface of the microbody having a similar thickness may also be removed. The sealing thin film ST_W disposed on the stepped portion STP between the end of the electrode layer 131 and the body 110 may also be removed by an etching solution.

Even in the area in which the open microhole OP_H is formed, the sealing thin film ST may be laminated with a uniform thickness in the direction of the external side surface, such that the end of the internal sealing thin film ST_I may be exposed at the time at which the sealing thin film ST_W on the electrode layer 131 is removed. When the etching process is stopped at this point, the internal sealing thin film ST_I may remain without retreating from the surface opening EN of the open microhole OP_H as in the example embodiment in FIG. 16.

To ensure the complete removal of the sealing thin film ST_W on the electrode layer 131, the over-etching process may be performed for a predetermined additional time, and in this case, the internal sealing thin film ST_I may be exposed to an etching solution during the over-etching and may be further etched. Accordingly, as illustrated in FIG. 19, the internal sealing thin film ST_I may remain in a form of being disposed to be retracted from the surface opening EN of the open microhole OP_H by a predetermined depth.

When the over-etching is performed for an excessively long time, the entire internal sealing thin film ST_I may be excessively etched and removed, or the opening of the open microhole OP_H may not be closed as illustrated in (b) in FIG. 18. Therefore, the over-etching time may be adjusted such that the internal sealing thin film ST_I may have an appropriate range of a retraction distance (e.g., 100 nm or less).

Hereinafter, the example embodiment will be described in greater detail with reference to manufacturing examples and experimental examples.

Manufacturing Example 1

A microbody including a body and an electrode layer was manufactured by the method described with reference to FIG. 10. Samples were prepared from the microbody manufactured using a scanning connected ion beam (FIB).

Manufacturing Example 2

An electronic component was manufactured by the method described with reference to FIGS. 10, 11, 13, 15, and 16. The sealing thin film formation process was performed in a barrel-type PECVD equipment using $C_3F_6$ as a source gas. Process conditions were determined such that an average deposition thickness of the deposition material was 100 nm. The process of removing the sealing thin film was performed in a barrel-type mechanical polishing apparatus. An average size of the abrasive particles used was 0.7 mm.

After completing the process of removing the sealing thin film, a plating layer was formed, thereby completing the electronic component.

A sample was prepared from the electronic component manufactured using the scanning connection ion beam (FIB).

Manufacturing Examples 3 to 5

An electronic component was manufactured by the same method as in Manufacturing example 2, other than the configuration in which the average deposition thickness of the deposition material was changed to 15 nm (Manufacturing example 3), 60 nm (Manufacturing example 4), and 300 nm (Manufacturing example 5).

Manufacturing Example 6

An electronic component was manufactured by directly forming a plating layer on the microbody without the process of forming the sealing thin film and the process of removing the sealing thin film.

Experimental Example

A breakdown voltage (BDV) was investigated for a number of samples according to Manufacturing example 1, and the results thereof are listed in Table 1 below.

TABLE 1

| Classification | Manufacturing Example 1 | Manufacturing Example 2 | Manufacturing Example 3 | Manufacturing Example 4 | Manufacturing Example 5 | Manufacturing Example 6 |
|---|---|---|---|---|---|---|
| min (V) | 38 | 22 | 6 | 9 | 24 | 2 |
| avg (V) | 89 | 90 | 89 | 89 | 89 | 89 |
| Occupancy of 38 V or less (ppm) | — | 7,732 | 24,169 | 20,619 | 7,692 | 23,936 |

In Table 1, "min" denotes a minimum value of the BDV measured in the manufacturing example, and "avg" denotes the average value of the BDV of the manufacturing examples. Referring to Table 1, Manufacturing example 1, which was not exposed to the plating process, had a relatively high BDV minimum value as compared to Manufacturing examples 2 to 6 having gone through the plating process. "Occupancy of 38V or less" in Table 1 represents the proportion of the samples that exhibited BDV properties less than or equal to 38V, which is the minimum value of BDV of Manufacturing example 1, in each Manufacturing example. It is indicated that the smaller the "Occupancy of 38V or less", the better the BDV properties may be. Referring to Table 1, among the manufacturing examples having gone through the plating process, Manufacturing Example 6 in which the process of forming the sealing thin film formation is not performed, or Manufacturing Example 3 in which the average deposition thickness of the sealing thin film is less than 20 nm exhibited relatively high "Occupancy of 38V or less," around 24,000 ppm. Manufacturing examples 2, 4, and 5, in which the average deposition thickness of the sealing thin film was 20 nm or more exhibited relatively small "Occupancy of 38V or less", such that improved BDV properties was exhibited. Manufacturing example 5 in which the average deposition thickness of the deposition material was 300 nm exhibited "Occupancy of 38V or less" similar to that of Manufacturing example 2 although the process time was three or more times the process time of Manufacturing example 2 in which the average deposition thickness of the deposition material was 100 nm.

According to the aforementioned example embodiments, using the electronic component and the method of manufacturing the same, the permeation of fluid into the electronic component may be blocked. Accordingly, defects caused by exposure of the internal member of the electronic product to fluid may be prevented.

While the example embodiments have been illustrated and described above, it will be apparent to those skilled in the art that modifications and variations could be made without departing from the scope of the present invention as defined by the appended claims.

What is claimed is:

1. An electronic component, comprising:
a microbody including a body including a plurality of dielectric layers and a plurality of internal electrodes disposed with a corresponding dielectric layer interposed therebetween, and an electrode layer disposed on an external side surface of the body and connected to a portion of the plurality of internal electrodes; and
a sealing thin film,
wherein the microbody includes a microhole extending in at least a portion of the dielectric layer, the internal electrode, and the electrode layer through a surface of the microbody, and
wherein the sealing thin film includes an internal sealing thin film disposed in at least a portion of an internal space of the microhole to seal the microhole.

2. The electronic component of claim 1, wherein an entirety of the internal space of the microhole is filled with the internal sealing thin film.

3. The electronic component of claim 1, wherein the microhole includes an empty space not filled by the internal sealing thin film, and the empty space is disposed on an inner side of a portion of the microhole filled with the internal sealing thin film.

4. The electronic component of claim 1, wherein the microbody further includes another microhole disposed in at least a portion of the dielectric layer, the internal electrode, and the electrode layer and spaced apart from a surface of the microbody.

5. The electronic component of claim 4, wherein among the microhole and the another microhole, the internal sealing thin film is disposed only in the microhole.

6. The electronic component of claim 1, wherein the sealing thin film further includes an external sealing thin film disposed on an interfacial surface between an end of the electrode layer and the body.

7. The electronic component of claim 6, wherein the external sealing thin film comprises the same material as a material of the internal sealing thin film.

8. The electronic component of claim 1, wherein the internal sealing thin film includes fluorine.

9. The electronic component of claim 1, wherein the internal sealing thin film includes crystallinity.

10. The electronic component of claim 1, further comprising:
a plating layer disposed on the electrode layer,
wherein the sealing thin film is not disposed between the electrode layer and the plating layer.

11. The electronic component of claim 1, wherein the internal sealing thin film is disposed to be retracted in a depth direction from an opening of the microhole.

12. The electronic component of claim 11, wherein the sealing thin film is not disposed on the external side surface of the microbody.

13. An electronic component, comprising:
a body including a plurality of dielectric layers and a plurality of internal electrodes disposed with a corresponding dielectric layer therebetween;
an external electrode including an electrode layer disposed on the body and connected to a corresponding internal electrode through respective first and second surfaces of the body, and a plating layer disposed on the electrode layer; and
an external sealing thin film disposed on an interfacial surface between an end of the electrode layer and the body without extending onto the first and second surfaces,
wherein a microhole extends from an outer surface of the electrode layer, in at least a portion of a dielectric layer of the plurality of dielectric layers, and in at least a portion of an internal electrode of the plurality of internal electrodes, and
wherein an internal sealing thin film is disposed in the microhole.

14. The electronic component of claim 13, wherein the external sealing thin film includes fluorine.

15. The electronic component of claim 13, wherein the external sealing thin film includes crystallinity.

16. The electronic component of claim 13, wherein a maximum thickness of the external sealing thin film is 20 nm to 200 nm.

17. The electronic component of claim 13, wherein another microhole extends from an outer surface of the body, and
wherein another internal sealing thin film is disposed in the another microhole.

* * * * *